(12) United States Patent
Berman et al.

(10) Patent No.: US 10,043,547 B2
(45) Date of Patent: Aug. 7, 2018

(54) SPRING CLIP LEADER AND HOUSING FOR MAGNETIC TAPE

(71) Applicant: International Business Machines Corporation, Armonk, NY (US)

(72) Inventors: David Berman, San Jose, CA (US); William M. Dyer, San Jose, CA (US); A. David Erpelding, San Jose, CA (US); Wayne I. Imaino, San Jose, CA (US); Ronald R. Labby, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 14/108,279

(22) Filed: Dec. 16, 2013

(65) Prior Publication Data

US 2015/0170708 A1   Jun. 18, 2015

(51) Int. Cl.
  *G11B 23/107* (2006.01)
  *B65H 75/28* (2006.01)
  (Continued)

(52) U.S. Cl.
  CPC ......... *G11B 23/037* (2013.01); *B65H 75/285* (2013.01); *G11B 15/6651* (2013.01);
  (Continued)

(58) Field of Classification Search
  CPC ......... G11B 15/28; G11B 15/66; G11B 15/67; G11B 15/295; G11B 23/20; G11B 23/26
  (Continued)

(56) References Cited

U.S. PATENT DOCUMENTS 3,025,011 A  *  3/1962  Camras ............... G11B 15/67
                                                  226/92
3,030,231 A  *  4/1962  Bar .................... G11B 15/674
                                                  206/53
(Continued)

FOREIGN PATENT DOCUMENTS

GB       861359      2/1961
GB       1125967     9/1968
(Continued)

OTHER PUBLICATIONS

IBM et al., "Velocity Control System," IPCOM000091811D, May 1, 1968, pp. 1-2.
(Continued)

*Primary Examiner* — William A. Rivera
(74) *Attorney, Agent, or Firm* — Zilka Kotab, P.C.

(57) ABSTRACT

A spring-like clip for a spool of tape, one end of the clip being attached to one end of the tape, and another end of the clip having an engagement feature that allows the clip to be pulled from the spool. The clip is configured to curve around the spool to hold the tape in place. In one general embodiment, a product includes a reel, a tape coupled to the reel, and a spring-like clip coupled to a free end of the tape. The clip is selectively positionable in a wrapped position where the clip wraps around a portion of the tape when the tape is wound onto the reel, thereby holding the portion of the tape in place on the reel. Systems for using various types of such products are presented, and generally include a tape drive configured for reading data from tape stored on such products.

24 Claims, 29 Drawing Sheets

(51) Int. Cl.
*G11B 23/037* (2006.01)
*G11B 15/665* (2006.01)
*G11B 15/67* (2006.01)

(52) U.S. Cl.
CPC .......... *G11B 15/672* (2013.01); *G11B 15/674* (2013.01); *B65H 2701/18483* (2013.01); *B65H 2701/378* (2013.01)

(58) Field of Classification Search
USPC .................................. 242/332.4, 532, 532.1
See application file for complete search history.

(56) References Cited

U.S. PATENT DOCUMENTS

| | | | |
|---|---|---|---|
| 3,172,181 A | 3/1965 | Fawick | |
| 3,197,150 A * | 7/1965 | Camras | G03B 1/58 |
| | | | 221/297 |
| 3,293,682 A * | 12/1966 | Giles | G06K 21/085 |
| | | | 15/210.1 |
| 3,612,434 A | 10/1971 | Johnson | |
| 3,645,473 A | 2/1972 | Kitch | |
| 3,773,276 A * | 11/1973 | Ganske | G11B 15/67 |
| | | | 206/53 |
| 3,797,777 A * | 3/1974 | Hosono | G03B 17/265 |
| | | | 206/53 |
| 3,833,114 A | 9/1974 | Osojnak | |
| 3,836,094 A | 9/1974 | Hollingsworth | |
| 3,880,382 A * | 4/1975 | Jantzen | G11B 15/66 |
| | | | 242/332.1 |
| 3,955,777 A | 5/1976 | Burdorf | |
| 3,991,956 A | 11/1976 | Machida | |
| 3,997,123 A | 12/1976 | King | |
| 4,168,811 A | 9/1979 | Lewis | |
| 4,296,857 A | 10/1981 | Huck | |
| 4,333,619 A | 6/1982 | Schoettle et al. | |
| 4,504,027 A | 3/1985 | Okamura et al. | |
| 4,625,866 A | 12/1986 | Posso | |
| 4,646,177 A | 2/1987 | Sanford et al. | |
| 4,813,540 A | 3/1989 | Barnell et al. | |
| 5,236,146 A | 8/1993 | Rudi et al. | |
| 6,814,324 B2 | 11/2004 | Gavit et al. | |
| 7,419,114 B2 * | 9/2008 | Onmori | G11B 15/672 |
| | | | 242/332.4 |
| 8,220,734 B2 * | 7/2012 | Vanderheyden | G11B 15/674 |
| | | | 242/332.4 |

FOREIGN PATENT DOCUMENTS

| | | |
|---|---|---|
| JP | 2001093259 | 4/2001 |
| JP | 2001233379 | 8/2001 |
| WO | WO2004006242 | 1/2004 |

OTHER PUBLICATIONS

IBM et al., "Tape Insertion and Leader Block Attachment," IPCOM000060037D, Feb. 1, 1986, pp. 1-2.

Berman et al., U.S. Appl. No. 15/973,354, filed May 7, 2018.

* cited by examiner

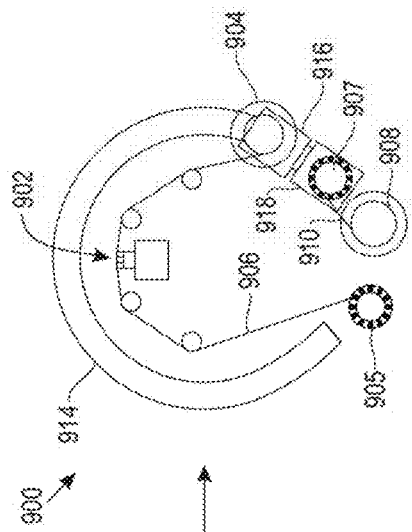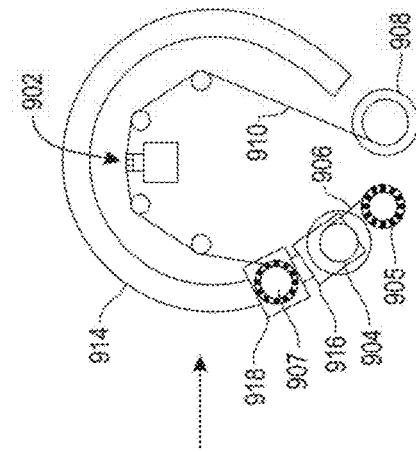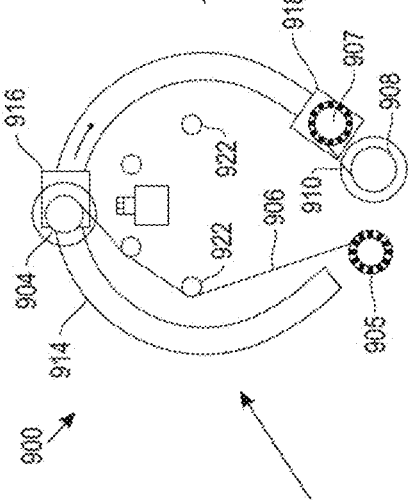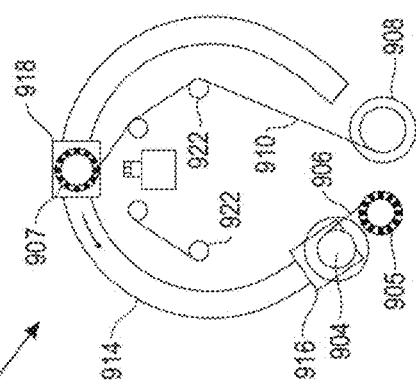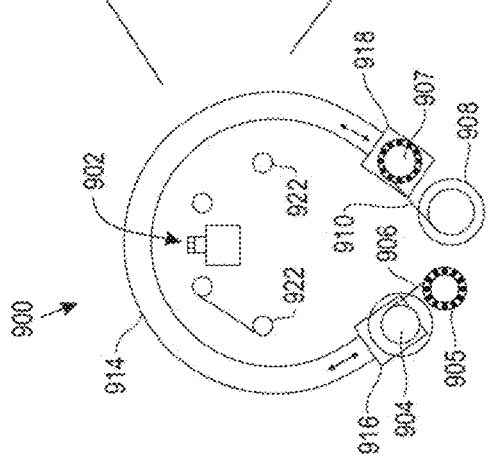

SPRING CLIP LEADER AND HOUSING FOR MAGNETIC TAPE

BACKGROUND

The present invention relates to data storage systems, and more particularly, to tape reels having spring-like clips coupled thereto, e.g., for protecting tape stored on the tape reels.

In magnetic storage systems, data are read from, and written onto, a magnetic recording medium utilizing magnetic transducers. Data are written on the magnetic recording medium by moving a magnetic recording transducer to a position over the medium where the data are to be stored. The magnetic recording transducer then generates a magnetic field, which encodes the data into the magnetic medium. Data are read from the medium by similarly positioning the magnetic read transducer and then sensing the magnetic field of the magnetic medium. Read and write operations may be independently synchronized with the movement of the medium to ensure that the data can be read from, and written to, the desired location on the medium.

In the near future, with the adoption of improved media, the cost of storing information (on a per byte basis) on tape is expected to decline by a factor of five or more with respect to magnetic disk. Also, short-term and long-term reliability will continue to favor tape-based storage. Furthermore, as more mass storage is allocated to cloud networks, most storage will be in large libraries, rather than on individual drives, which is a consideration favoring tape-based storage. One historical disadvantage of tape-based storage with respect to disk-based storage was the relatively large volumetric overhead required to store cartridge shells that encase the individual reels of tape, in addition to other components thereof.

BRIEF SUMMARY

Embodiments of the invention relate to a product. One embodiment includes a reel, a tape coupled to the reel, and a spring-like clip coupled to a free end of the tape. The clip is selectively positionable in a wrapped position where the clip wraps around a portion of the tape when the tape is wound onto the reel, thereby holding the portion of the tape in place on the reel.

Another embodiment includes a spring-like clip for a spool of tape, one end of the clip being attached to one end of the tape, and another end of the clip having an engagement feature that allows the clip to be pulled from the spool. The clip is configured to curve around the spool to hold the tape in place.

Other embodiments of the invention relate to a system. In one embodiment, a system includes a plurality of tape reels, and a tape drive configured for reading data from tape stored on at least one of the plurality of tape reels. At least some of the tape reels have a tape wound thereon and a spring-like clip coupled to a free end of the tape. The clip is selectively positionable in a wrapped position where the clip wraps around a portion of the tape when the tape is wound onto the reel, thereby holding the portion of the tape in place on the reel.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 9A-9F are schematic representations of steps for tape self-threading using a tape drive, while performing overlapped operations, according to one embodiment.

DETAILED DESCRIPTION

Figure 1:
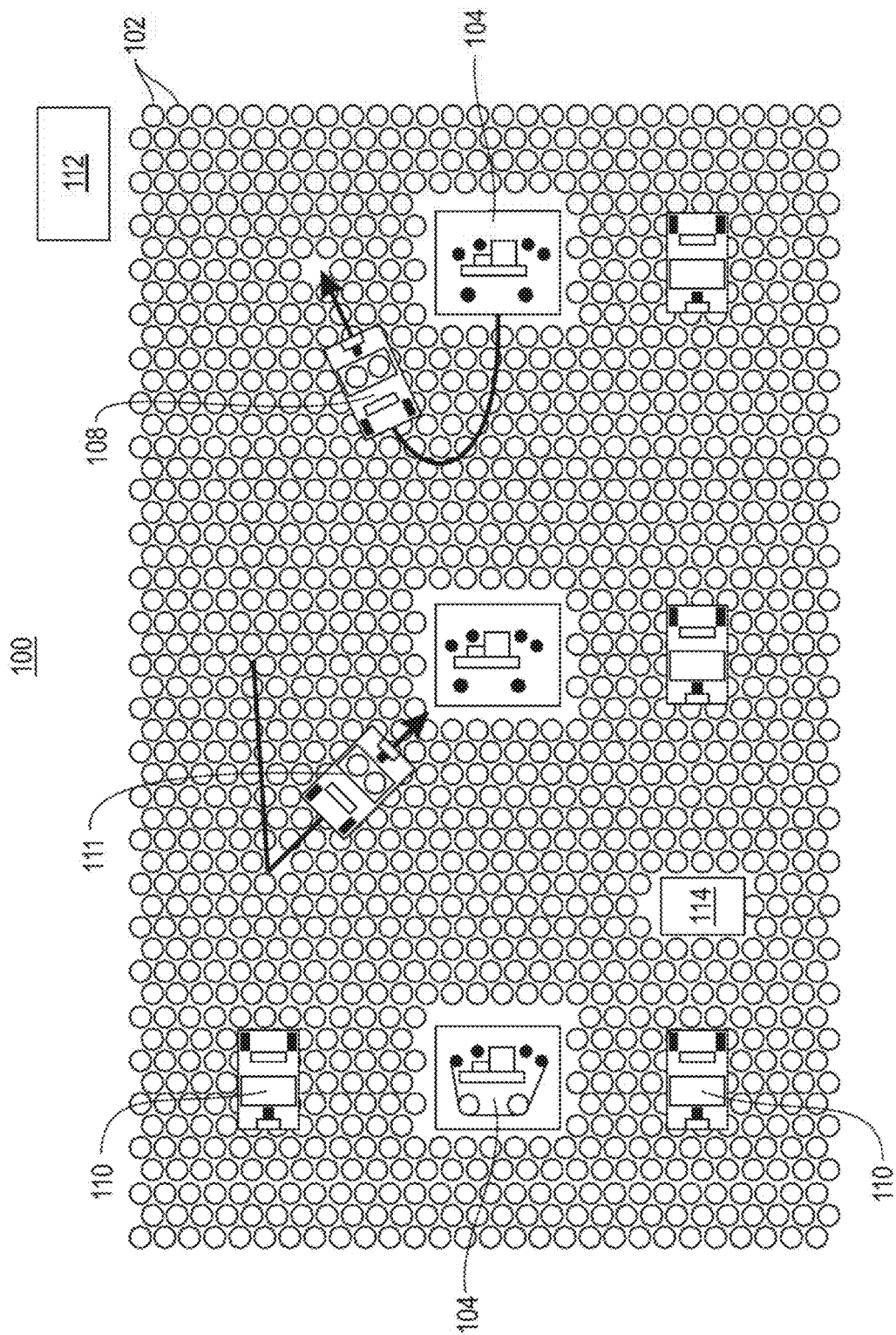
FIG. 1 is a top down view of a system using mobile robots for faster access to tape, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape drive systems having tape reels that incorporate a clip, as well as operation and/or component parts thereof. According to different embodiments, the clip may not only protect the tape, but also to facilitate the tape end transfer, e.g., in a tape drive, without requiring a large volumetric overhead as seen in conventional products.

In one general embodiment, a product includes a reel, a tape coupled to the reel, and a spring-like clip coupled to a free end of the tape. The clip is selectively positionable in a wrapped position where the clip wraps around a portion of the tape when the tape is wound onto the reel, thereby holding the portion of the tape in place on the reel.

In another general embodiment, a spring-like clip for a spool of tape is provided. One end of the clip is attached to one end of the tape, and another end of the clip having an engagement feature that allows the clip to be pulled from the spool. The clip is configured to curve around the spool to hold the tape in place.

In another general embodiment, a system includes a plurality of tape reels, and a tape drive configured for reading data from tape stored on at least one of the plurality of tape reels. At least some of the tape reels have a tape wound thereon and a spring-like clip coupled to a free end of the tape. The clip is selectively positionable in a wrapped position where the clip wraps around a portion of the tape when the tape is wound onto the reel, thereby holding the portion of the tape in place on the reel.

Tape drive data rates have increased, and currently are capable of exceeding 200 MB/s. However, because tape is a linear medium, accessing a desired data location typically requires a large amount of time. Thus a tape-based data storage system may spend a relatively small fraction of its time actually reading data from and/or writing data to the tape, while the great majority of the time is spent loading/unloading and winding the tape.

As a result, in conventional products, loading and unloading the tape can require greater than ten seconds, and locating a piece of data can require more than a minute. This is economically inefficient, as the majority of the time is spent using only motor control, e.g., to wind the tape, and as a result, the expensive portion of the drive, e.g., the recording heads, actuator, read and/or write electronics, etc. are left idle and are not effectively utilized. As a result, the large amount of time in which tape drives are idle creates a need for a plurality of drives to operate simultaneously in order to achieve a high rate of input/output operations per second (IOPS). However, adding more drives, tape transport mechanisms, etc. is an unfavorable solution as it is inefficient.

In sharp contrast, the embodiments and/or methods described and/or suggested herein preferably allow a single drive, e.g., including a single read/write mechanism, to overlap operations of two or more tapes, as will be discussed in further detail below. Thus, a single set of heads, actuators and/or drive electronics with multiple reels and reel drivers may be used to efficiently achieve high IOPS at lower cost. Performing a first tape read, write and/or locate while locating a position on a second tape allows the system throughout to be increased significantly. In different approaches, such a system can be constructed for either single spool or dual spool tape configurations as will be discussed in further detail below.

FIG. 1 depicts a detailed view of a Linear Media Storage Module 100 in accordance with one embodiment. As an option, the present Linear Media Storage Module 100 may be implemented in conjunction with features from any other embodiment listed herein, such as those described with reference to the other FIGS. Of course, however, such Linear Media Storage Module 100 and others presented herein may be used in various applications and/or in permutations which may or may not be specifically described in the illustrative embodiments listed herein. Moreover, the Linear Media Storage Module 100 presented herein may be used in any desired environment. Further still, the Linear Media Storage Module 100 is in no way limited to that which is illustrated in FIG. 1 and may include any parts and/or orientation of parts which would be desirable depending on various embodiments.

As shown by the partial top down view of FIG. 1, a Linear Media Storage Module 100, such as a tape library, may include one or more mobile robots 110 for transporting at least one tape reel 102, which may or may not be part of a tape cartridge, to and from tape drives 104 for reading data from the tape.

The linear media (i.e., tape) may preferably be wound on tape reels 102, also referred to herein as spools. According to an exemplary embodiment, at least some of the tape reels 102, preferably having tape wound thereon, may further include a spring-like clip (e.g., see 706 of FIGS. 7A-7D) coupled to a free end of the tape, where the free end is defined as the end of the tape that is unwound from the reel 102 first, as will be described in detail below.

The tape reels 102 may lie on a lower surface 304, such as a "floor," of a rest area for storing the reels when the reels are not in use. According to different approaches, the rest area may have one level, more than one level, etc., as explained below, and may further include, but is not limited to, ramps to preferably provide for the movement of linear media between the levels. The rest area is preferably a horizontal surface on which the tape reels rest; however in other approaches, the rest area may incorporate a vertical, angled, terraced, stacked, etc. surface, or combinations thereof. In such alternate approaches, the tape reels may be attached to and/or supported by the rest area by using hooks, lips, magnets, shelves, sleeves, posts, etc. or some other design to counteract the force of gravity on the tape reels if desired.

Figure 2:
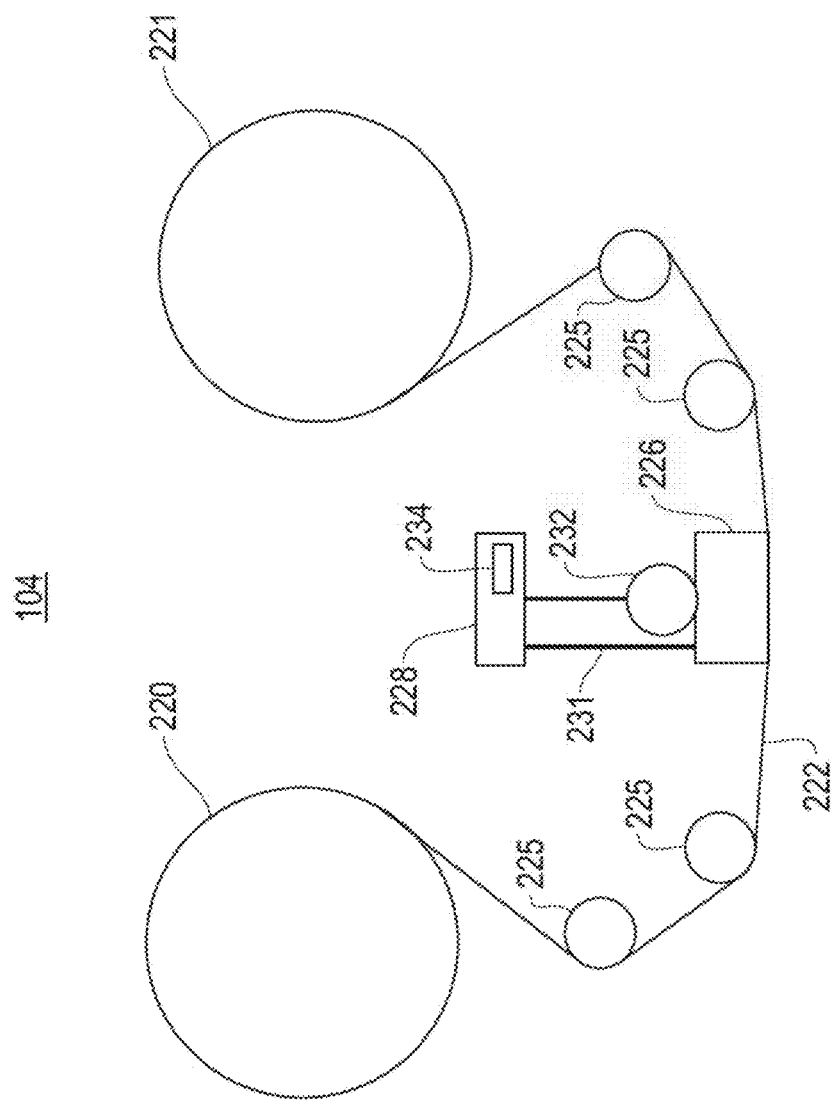
FIG. 2 is a schematic diagram of a simplified tape drive system according to one embodiment.

FIG. 2 illustrates a simplified view of the tape drive 104 of a tape-based data storage system, which may be employed in the context of the present invention. While one specific implementation of a tape drive is shown in FIG. 2, it should be noted that the embodiments described herein may be implemented in the context of a variety of tape drive systems.

As shown, a tape supply reel 220 and a take-up reel 221 are provided to support a tape 222. One or more of the reels may form part of a removable cartridge and are not necessarily part of the tape drive 104. The tape drive, such as that illustrated in FIG. 2, may further include drive motor(s) to drive the tape supply reel 220 and the take-up reel 221 to move the tape 222 over a tape head 226 of any type. Such head may include an array of readers, writers, or both.

Although a tape drive 104 may be capable of both reading and writing linear media, it may be preferable for a given drive or drives to perform only one of these operations (i.e., reading or writing) for an extended period of time. Additionally, there may be a cost advantage in having separate linear media drives due to the reduced amount of electronics, heads, etc. Moreover, since the sequential write method provides higher effective random write performance, system cost may be reduced by combining a number of write drives with a larger number of read-only drives. Thus, it may be preferable for at least a subset, a majority, all, etc. of the drives in a linear storage media tier to be optimized for writing or reading exclusively.

Guides 225 guide the tape 222 across the tape head 226. Such tape head 226 is in turn coupled to a controller assembly 228 via a cable 231. The controller 228 typically controls head functions such as servo following, writing, reading, etc. The controller may operate under logic known in the art, as well as any logic disclosed herein. The cable 231 may include read/write circuits to transmit data to the head 226 to be recorded on the tape 222 and to receive data read by the head 226 from the tape 222. An actuator 232 controls the position of the head 226 relative to the tape 222.

An interface 234 may also be provided for communication between the tape drive and a host (integral or external) to send and receive the data and for controlling the operation of the tape drive and communicating the status of the tape drive to the host, all as will be understood by those of skill in the art.

Figure 3:
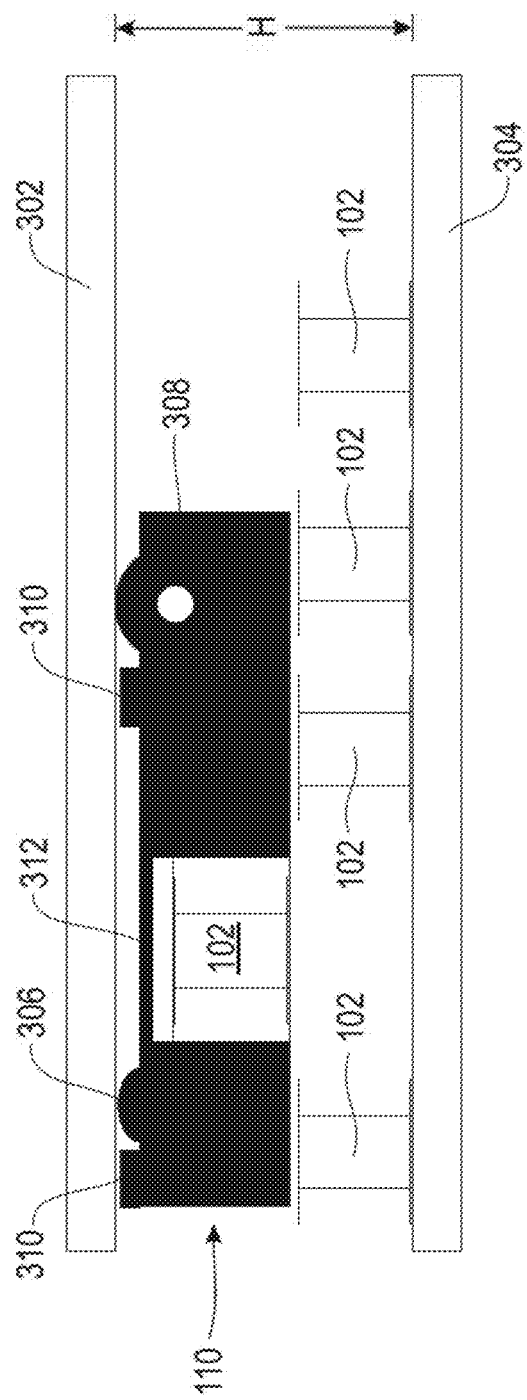
FIG. 3 is a side view of a mobile robot, according to one embodiment.

The tape on the selected tape reel or pair of tape reels may be accessed by the mobile robots 110, which may be miniature remote-controlled vehicles that move via contact with a surface (such as an upper surface 302, used interchangeably with the term "ceiling," as shown in FIG. 3). Thus, the tape reels may lie on a lower surface, such as a "floor," while a mobile robot maneuvers on the upper surface via contact with the surface, such as by utilizing drive wheels and magnetic attraction between the robot and the upper surface or portions of the upper surface (see FIG. 3). In one approach, the tape library may comprise more than one level. On each level, tape reels may be arranged on a lower surface (used interchangeably with the term "floor") in a dense pattern. This arrangement is shown in partial top down view of FIG. 1, according to one embodiment.

A contiguous tape may be stored on a single reel, and may include a pin or other end piece that enables threading of the tape in the tape drive. In other approaches, the tape may be coupled to a pair of reels, e.g., in a tape cartridge. According to one embodiment, magnetic tape may be included in miniature tape reels 102 which have only a fraction of the tape length of a standard tape cartridge, thereby decreasing seek time. Such shorter length may be, e.g., less than about $\frac{1}{5}$th the tape length of a standard Linear Tape Open (LTO) tape cartridge, or less than about $\frac{1}{25}$th the tape length of a standard tape cartridge, or less than about $\frac{1}{50}$th the tape length of a standard tape cartridge, etc. In some approaches, a length of tape on the plurality of tape reels 102 may be less than about 50 meters for each tape reel 102. However, in other approaches, a length of tape on the plurality of tape reels 102 may be less than about 25 meters, or 20 meters or less, etc. for each tape reel 102, depending on the desired embodiment. It should be noted that, as used herein, the term "about" with reference to some stated value refers to the stated value±10% of said value.

The seek time of tape-based systems using such tape reels may also or alternatively be decreased by increasing the locate speed, e.g., to about 20 meters per second (m/s) or faster. "Locate time" refers to the time required for the tape to wind to the beginning of a data set (or file) after the tape is loaded in the tape drive. If the tape length is reduced to about 20 m or less and the locate speed is about 20 m/s, the average locate time is (20 m/20 m/s)/2=0.5 s. In addition to decreasing the seek time in the drive, the system seek time may be reduced by structuring the tape library to achieve a mean load time of about 0.5 s. "Load time" refers to the time between a first time, when a request reaches the tape library, and a second time, when the relevant tape reel(s) are loaded in the tape drive.

According to one embodiment, the tape system is configured such that the average seek time is less than about 2 seconds, preferably about 1 second or less. The seek time is the delay between a first time when a request to access data is received by the tape library, and a second time when the tape library begins to provide the data to the requester.

With continued reference to FIG. 2, the tape reels 102 may be closely packed, for example in a hexagonal array, ordered array, circular arrangement, etc., to maximize the number of tape reels that may be stored in a limited amount of space.

According to one embodiment, a diameter of each of the plurality of tape reels 102 may be less than about 100 mm, such as less than about 50 mm, less than about 40 mm, less than about 30 mm.

In some approaches, a single tape drive 104 is available for reading and/or writing tape on the tape reels 102. Depending on the frequency with which files are read, a plurality of tape drives 104 may be available for reading and/or writing tape on the tape reels 102, as shown in FIG. 1 by the leftmost tape drive 104 reading a tape. The tape drives 104 may be located about the surface in any arrangement as would be known to one of skill in the art, preferably such that quick access to the tape drives 104 is possible to reduce loading and data access times. In a preferred approach, a tape drive (e.g., a tape drive system) may include a first set of motors for performing positioning operations on a first tape and a second set of motors for performing positioning operations on a second tape as discussed in further detail below with reference to FIGS. 9A-17.

In one approach, the Linear Media Storage Module 100 may be configured to permit the mobile robot 110 to locate, retrieve, and transport any one selected tape reel 102 to the tape drive 104, and to initialize reading of the tape by the tape drive 104 within about five seconds of receiving a request to read data from the tape of the selected tape reel 102, more preferably within about 2 seconds, and ideally less than about 1 second. In a further approach, the system may include at least one winding station 114 for performing coarse locate operations (prelocating) on the reels to position the tape near the data position for a subsequent read/write operation, prior to the reels being mounted to the at least one linear media drive. In a preferred approach, coarse locate operations may include locating desired portions of the tape stored on a given tape reel in a minimized time.

In several embodiments, several mobile robots 110 move unconstrained along the surface, e.g., two, five, or more. In other embodiments, only a single robot may be present on a given level. It may be advantageous for the mobile robots 110 to be unconnected by cables to any other part of the Linear Media Storage Module 100. This design favors fast robot motion, and facilitates the mobile robots 110 being capable of moving between levels, rooms, enclosures, etc. Also, when multiple mobile robots 110 are used, any problem with cables getting tangled together from different robots 110 is eliminated when the mobile robots 110 are controlled wirelessly, e.g., via a robot controller 112.

According to one approach, a robot controller may be in communication with, and may control and/or manage the mobile robots 110. In various approaches, the robot controller may control and/or manage normal operating conditions, high traffic conditions, damage situations, overflow, high priority requests. etc. or any other situation which would be apparent to one skilled in the art upon reading the present description. Additionally, the robot controller may be connected to a host, a user, an administrator, computing device, etc. which may provide requests to be processed by the robot controller.

Thus, a plurality of mobile robots may be used in a system, e.g., the linear storage media tier, which may utilize the plurality of robots in overlapping operations to increase data throughput of the system. This is possible because a first robot can be returning a first tape from the drive to the rest location, while a second robot is delivering a second tape from its rest location to the drive. Therefore, a system may include at least one, at least two, multiple, etc. mobile robots for transporting the linear storage media between the rest area and the at least one linear media drive. The mobile robots may preferably transport the linear storage media by retrieving at least one tape reel and moving it to a desired location e.g., a winding station a drive, the rest area, etc. According to various approaches, the mobile robots may include, but are not limited to, any mobile robot described and/or suggested herein, depending on the desired embodiment.

In other approaches, winding stations compatible with single spools may include a take-up reel which can be dismounted from the winding station along with the storage spool, and taken to a drive as if a dual spool. When a single spool is placed in the winding station, one end of the tape thereon may be attached to a temporary take-up reel. This may allow the single spool to be coarse located in the winding station and then transported to a given drive while maintaining the coarse located data position. As will be discussed in further detail below, a coarse locate operation may quickly wind the tape until reaching a position believed to be slightly before a desired location on a magnetic tape where a read and/or write operation will commence. Moreover, once the tape from the single spool has been rewound and the temporary take-up reel is empty, the temporary take-up reel may be transported back to one of the winding station, e.g., to be used for the next coarse located single spool.

As a result, multiple winding stations may be used for a given drive. This approach may be advantageous where high throughput is desirable, but where the locating operations are slow. Further, incorporating winding stations allows more flexibility for embodiments having multiple drives, as the location operation is not tied to a particular drive, and a located tape may be mounted on the first free drive. A further advantage occurs with dual spools, in that extra winders may be used to rewind spool pairs to the middle of the tape, thus reducing the mean locate time for subsequent 10 operations. The winding stations may even be disposed on the mechanism used to deliver tapes to the drive (e.g. a robot).

Other operations may be overlapped as well. For example, with continued reference to FIG. 1, at least one winding station 114 may be included for performing coarse locate operations on the tape reels 102 prior to the reels being mounted to the tape drive 104 for read and/or write operations, and subsequent rewind operations. In a preferred approach, coarse locate operations may include locating particular portions of the tape stored on a given tape reel in a minimized time.

Moreover, the coarse locate operations may be conducted while other reels are being read and/or written to, thereby overlapping operations. For example, which is in no way intended to limit the invention, a tape reel may have a particular data set written thereon up to a certain location between ends of the tape medium at a certain wrap, which can be defined as a set of tracks written to the tape medium, in one direction, at the same time. To prepare the tape reel for writing thereon, the coarse locate operation may quickly wind the tape until reaching a position believed to be slightly before the end of the written data. If the winding station has a head, the winding station may then proceed in a slower fashion until the end of the written data is located. If the winding station does not have a head, the media drive that subsequently receives the tape reel can quickly find the end of data on the tape because of the pre-positioning. Thus, the coarse locate operation may locate the end of written data faster than is possible using the drives directly, without passing the end of the written data, thereby preventing unnecessary time delay in locating the end of the written data.

In another example, which is in no way intended to limit the invention, coarse locate operations may be used to reduce the total time from receipt of a read request until the data are returned to the host from a tape reel. The coarse locate operations may utilize the mapped location of data written to the reels which may be stored in a map of a mapping module. This may preferably reduce the read access time to a block of data stored on a given reel (explained in further detail below). Thus, coarse locate operations of the at least one winding station may overlap locating operations with reading and robot motion, which may result in a further increase to the utilization of the system.

To keep track of where data are stored, particularly in relation to corresponding data, some sort of mapping scheme is desirable. Such a mapping scheme may preferably be capable of identifying the physical location of the current version of each logical block, of which the information is also referred to herein as meta-data. According to different approaches, the mapping scheme may store the physical locations of data in terms of the magnetic indexes recorded during tape manufacture and/or the length along the tape where the data were written, e.g., which may be determined by the number of reel revolutions, longitudinal position (LPOS) information, etc. According to one approach, the mapping scheme may use mapping tables. The mapping tables keep track of where the data and/or meta-data are stored, preferably such that any data may be located and accessed after it is written. Thus, mapping tables may preferably be accessed and/or updated with each write and/or read request. However, the mapping tables may be accessed and/or updated after each write request has been completed, before each read request is processed, at timed intervals, upon request (e.g., from a user), etc. depending on the desired embodiment. Mapping tables may be stored on the tape itself, a tape cartridge, a database such as a tape library database, etc.

The mobile robots 110 may have predetermined "resting" locations, as shown by mobile robots 110, according to one embodiment. As shown in FIG. 1, mobile robot 111 has moved from a resting location, acquired tape reels, and is moving toward a tape drive to load the tape reels in the tape drive for reading tape therefrom. Also, mobile robot 108 has retrieved tape reels from a tape drive which has completed a reading operation, and is returning the tape reels to their storage location. Of course, this movement is exemplary only, and not meant to be limiting on the invention in any way. The mobile robots 110 may retrieve at least one tape reel, but may preferably overlap their tape retrieval operations, depending on the desired embodiment.

The mobile robots 110 may move in straight line increments, or may move more naturally in arcing patterns between positions on the surface, according to various embodiments. Also, the mobile robots 110 may avoid objects in their path according to any method as would be understood by one of skill in the art upon reading the present descriptions.

In some previous tape library geometries, a library gripper accesses an array of tape reels and/or tape cartridges, through motion of a first carriage along a rail or pair of rails. The first carriage in turn holds another set of rails or guides which enables motion of a second carriage holding the gripper. The scheme enables the gripper to access anywhere in two dimensions, where the tape reels or tape cartridges are located. Alternately, in some previous designs, the second carriage has been replaced by a rotary motion which operates about the axes of the first carriage. This scheme limits the flexibility of the library, because grippers (or robots) may interfere with one another. For example, if the grippers use the same set of rails, then they cannot move past each other. Also, there is generally no available space in tape libraries for the installation of an additional set of rails, so this scheme is severely limited in its functionality. In addition, these previous designs do not facilitate easy recovery of access to the tape reels and/or tape cartridges when a gripper fails.

In various embodiments, various systems herein use "unconstrained" robots, which facilitate access to the tape reels and/or tape cartridges. Here, the term "unconstrained" indicates that movement is not constrained to rails, tracks, guideways, pathways, etc., but instead movement is free in at least two dimensions, e.g., along a surface. Thus, unconstrained mobile robots are easily added or removed from the surface, and they can easily maneuver around each other along the surface, since they are not fixed to a rail or track.

In other approaches, gantry-type robotic accessors may be used to transport tape reels and/or cartridges.

In yet other approaches, any type of transport mechanism may be used to move tape reels and/or cartridges.

As shown in FIG. 3, according to one embodiment, the surface across which the mobile robots 110 travel unconstrained may be an upper surface 302 (such as a ceiling in one approach) and may be unpatterned so that the mobile robots 110 are unconstrained, e.g., not limited to motion on particular tracks, paths, rails, etc. Thus each mobile robot 110 is capable of movement independent of movement of any other mobile robot 110, e.g., each mobile robot 110 may cross the path that any other mobile robot 110 has taken or will take. Similarly, by attaching the mobile robot 110 to a surface 302 separate from a surface 304 supporting the tape reels 102, the mobile robots 110 are not constrained to follow aisles, paths, corridors, etc., between groups, columns, rows, etc., of tape reels 102. In one example, this movement may be analogous to the movement of a shopping cart through a supermarket. However, instead of being constrained to moving between the shelves of the supermarket, the mobile robots 110 are capable of moving unconstrained along the ceiling of the supermarket, capable of selecting any desired item from below in the shelves, as an example. The ability to use multiple mobile robots 110 to access a group of tape reels 102 provides faster access of short, popular files. This geometry is much more flexible than previous configurations, in which the tape cartridge grippers were supported on x and y positioners which could not cross paths. The mobile robots 110 may be coupled to the upper surface 302 using magnets 310 or some other coupling or attraction device that biases the mobile robots 110 towards the upper surface 302. By allowing the mobile robots 110 to maneuver on the upper surface 302, the tape reels 102 may simply rest on a lower surface 304, such as a floor. The magnets 310 may bias the mobile robot 110 toward the upper surface 302 with much more force than gravity biases the mobile robot 110 toward the lower surface 304, allowing a much higher frictional force of the mobile robot wheels 306, 308, thereby enabling faster robot acceleration and thus faster seek times.

In one approach, the mobile robot 110 may have three wheels 306, 308; two rear wheels 308 and one front (maneuvering) wheel 306 or ball. In another three-wheel configuration, the mobile robot 110 may have two front wheels 308, and a rear (maneuvering) wheel 306 or ball. For sake of clarity, a maneuvering wheel in this discussion indicates a wheel whose direction of positioning or rotation with respect to the robot body is not fixed. Of course, the mobile robot 110 may have any number of wheels 306, 308 or other apparatus for causing movement of the mobile robot 110 as would be known to one of skill in the art. For example, one embodiment of the mobile robot 110 may have two drive wheels and two (maneuvering) wheels or balls. Steering of the robot may be accomplished in any known manner, such as by independently driving two of the wheels with a caster-type maneuvering wheel, steering using the maneuvering wheel, and driving and steering with the maneuvering wheel, etc.

The mobile robot 110 may have a reel gripper 312, which when the mobile robot 110 is positioned above a desired tape reel 102 or set of tape reels 102, may grab, attract (for example, magnetically), secure, or otherwise take hold of the tape reel 102 such that it may be loaded into the mobile robot 110 and transported to a tape drive or back from a tape drive to the tape reel's storage location. In one approach, the mobile robot 110 may include a reel gripper 312 which may move the reels 102 vertically from a horizontal rest area 304, for engagement with the at least one mobile robot 110 thereabove. Moreover, according to various approaches, the reel gripper 312 may include a retractable arm, a magnet, a suction device, etc.

With continued reference to FIG. 3, in some embodiments, the mobile robot 110 may have a height such that it may be able to maneuver above the tape reels 102 in a space H of about 1.75", which measures about 1U in a standard rack configuration. The smallest units used for rack-mounted computer components are "1U" units, which are 1.75" high. Since a reel for standard 0.5" wide magnetic tape may be as thin as 0.58", this 1U unit may be thick enough to hold a single layer of storage having a layer of tape reels 102 plus mobile robots 110. Thus a single layer design having mobile robots 110, tape reels 102, and drives may be used for various tape library configurations, ranging from a single layer to multiple stacked layers, which may fill an entire storage room, or any size desired.

In one approach, the plurality of tape reels 102 may be spaced from and located within a distance of about 15 cm from the upper surface, e.g., 15±1.5 cm, less than about 20 cm, less than about 10 cm, less than about 5 cm, or any value in the foregoing ranges.

The Linear Media Storage Module 100 may also comprise a controller 112 for directing movement of the mobile robot 110. The controller 112 may be on board the mobile robot 110, or away from the robot 110 (as shown in FIG. 1) and in communication therewith via any type of communication channel (such as wireless, wired, infrared, etc.).

According to one illustrative embodiment, a Linear Media Storage Module 100 comprises at least one tape drive 104 configured for reading data from tape stored on one of a plurality of tape reels 102, at least one mobile robot 110 having a volume of less than about 1000 cubic inches (and in some approaches less than about 900 $in^3$, less than about 750 $in^3$, less than about 500 $in^3$, less than about 250 $in^3$, less than about 100 $in^3$, less than about 50 $in^3$) configured for selectively retrieving one or more of the plurality of tape reels 102 and transporting the one or more retrieved tape reels 102 to the tape drive 104. The mobile robot 110 moves along a surface, and is preferably not mechanically constrained to move along a pre-determined trackway or path (i.e., it is unconstrained). In some approaches, the mobile robot 110 may be mechanically unconstrained and may be able to move autonomously across the surface via any desired path.

To assist in navigation of the mobile robot 110, at least one of the lower and upper surfaces may include an optical pattern usable for navigation of the mobile robot 110, and the mobile robot 110 may be configured for recognizing the optical pattern.

Figure 4A:
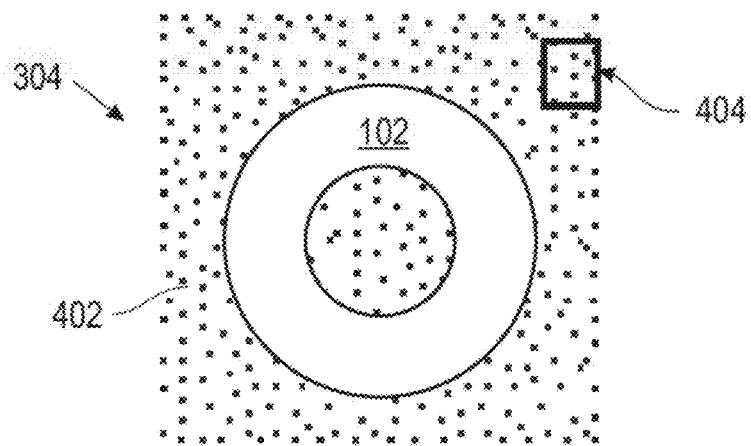
FIG. 4A is an illustration of an optical pattern on a surface, according to one embodiment.

As shown in FIG. 4A, the lower surface or floor 304, for example, may include an optical pattern 402 designed for the mobile robot to locate its position. This optical pattern 402 may be a rectangular grid extending over the entire floor 304, with each grid square 404 labeled with readable code identifying the row and column of the particular grid square 404. This readable code may take any form as would be understood by one of skill in the art.

Figure 4B:
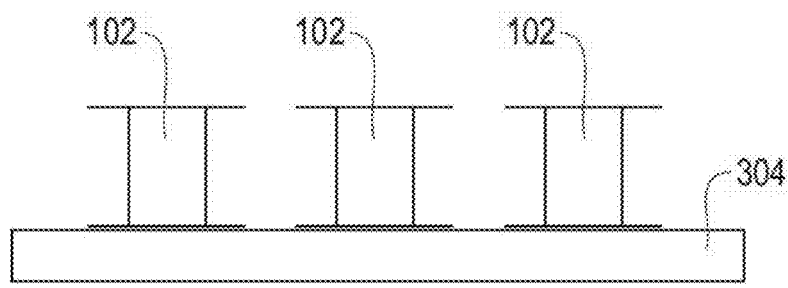
FIG. 4B is a partial side view of a surface design, according to one embodiment.
Figure 4C:
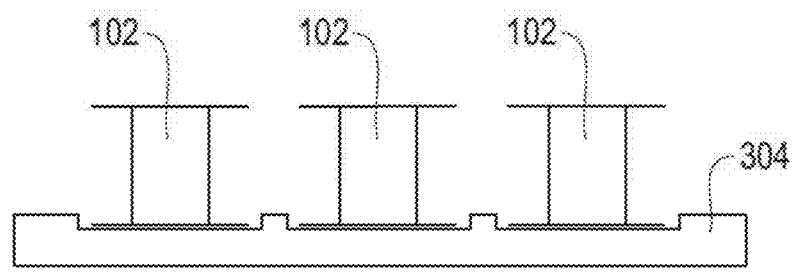
FIG. 4C is a partial side view of a surface design, according to one embodiment.
Figure 4D:
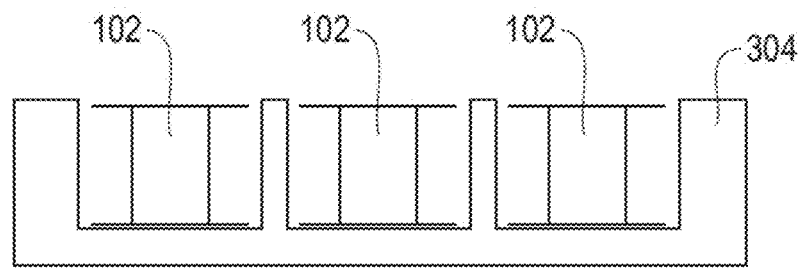
FIG. 4D is a partial side view of a surface design, according to one embodiment.
Figure 4E:
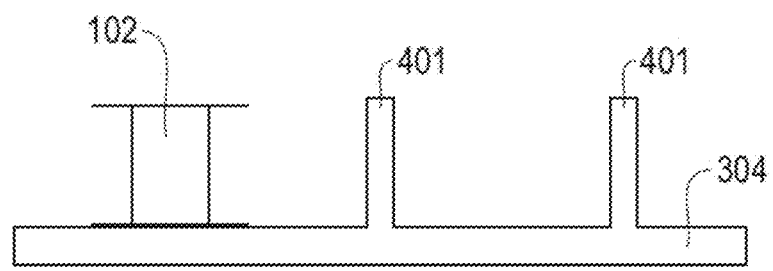
FIG. 4E is a partial side view of a surface design, according to one embodiment.

The floor 304 may be planar, as shown in FIG. 4B, covered with small indentations as shown in FIG. 4C, or have lattice defining receptacle areas in which the tape reels 102 are positioned as shown in FIG. 4D, according to various embodiments. By extending the lattice up past the tape reels 102, it may form a surface on which the mobile robot 110 may be supported, and the mobile robots 110 would not maneuver along the upper surface but instead would maneuver on the lower surface formed by the top surface of the lattice, according to one embodiment. In another approach, as shown in FIG. 4E, posts 401 may extend upwardly from the lower surface 304 to hold reels in place. The posts 401 may be used in combination with other approaches, such as those shown in FIGS. 4B and 4C.

Figure 5A:
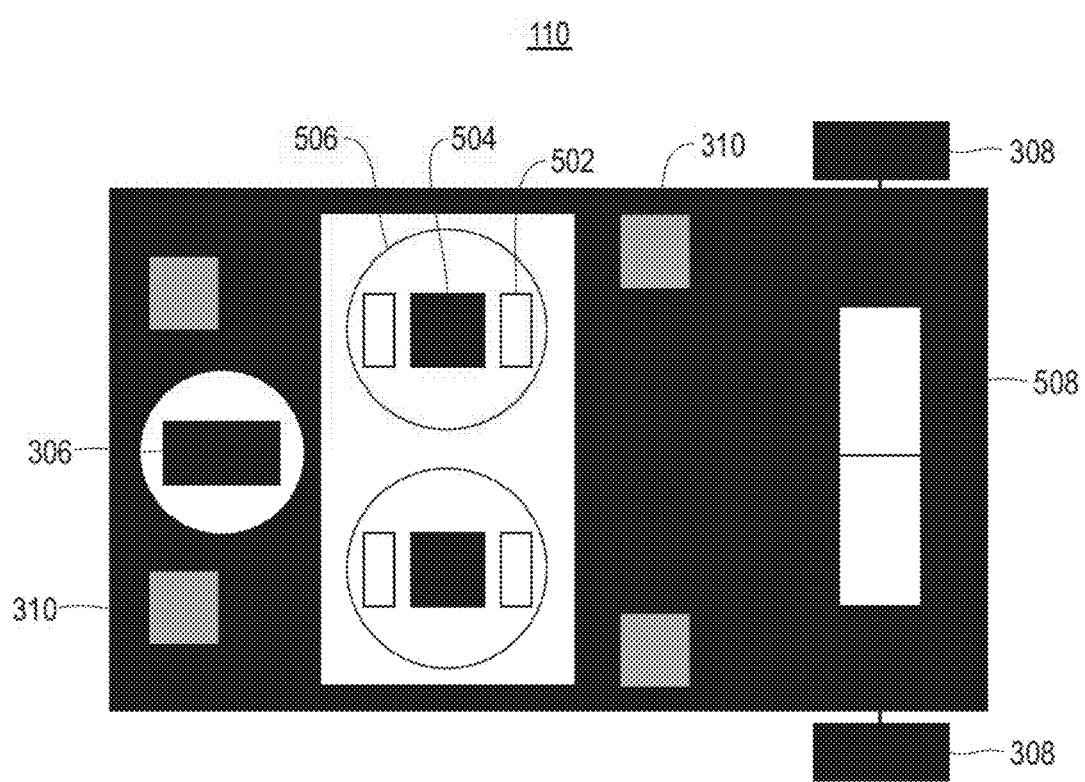
FIGS. 5A-5B are detailed views of a mobile robot, according to one embodiment.
Figure 5B:
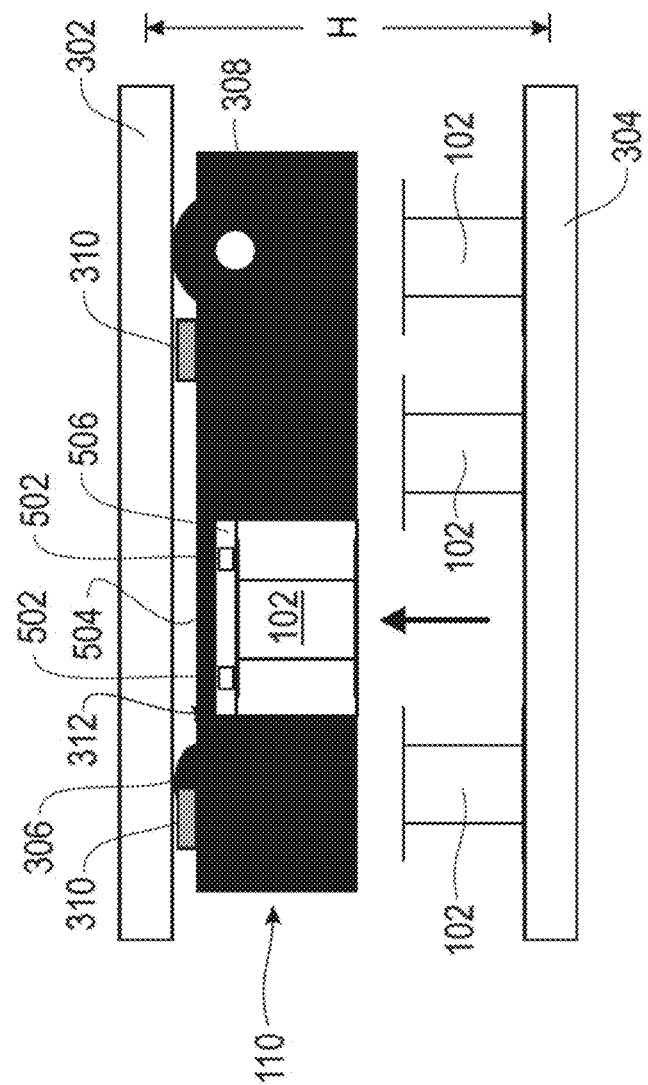

The design of the mobile robot 110 may include additional features, abilities, etc., as would be understood by one of skill in the art upon reading the present descriptions. In one embodiment, a mobile robot 110 is shown in FIGS. 5A-5B, according to one approach. In this example, one or more motors 508 power symmetric drives wheels 308 that allow forward and backward motion, and in a further approach, the drive wheels 308 may provide steering if the drive wheels 308 are operated independently using two symmetric drive motors 508. These motors 508 may be attached to each wheel 308 by a single step-down gear. The mobile robot 110 may additionally be supported by one or more other omni-directional passive wheels 306, which may move in any direction, and may be maneuverable (e.g., steerable, positionable, etc.), in some approaches. The omni-directional wheel(s) 306 may be caster wheels, and more preferably may be spherical balls which are also referred to as ball transfers.

To pick up the tape reel(s) 102, a simple platform-type reel gripper 312 may be lowered and raised by a solenoid or motor (not shown). If the tape reels 102 are topped by a magnetic plate, the tape reels 102 may be gripped to the simple platform-type reel gripper 312 by energizing electromagnets 502. One or more cameras 504 may allow for navigation of the mobile robot 110. A camera 504 may be placed above each reel holding position 506, enabling the mobile robot 110 to determine its position and to deliver a tape reel 102 directly into a tape drive. The mobile robot 110 need not be made precisely, because the cameras 504 may simultaneously image the tape reels 102 and location grid (or the tape reel chucks on the drive) to precisely position the tape reels 102, in some approaches.

To enable multiple mobile robots 110 to work in the same work space, such as the same floor, there are preferably no cables attached to the mobile robots 110. The mobile robot 110 uses little power, and a peak speed of about 2 m/s in some embodiments is sufficient to pick up the tape reel 102 and bring it to the drive within a half second. For a 150 gram mobile robot 110, the corresponding kinetic energy would be about 0.3 Joule. This amount of energy may be supplied by a rechargeable battery, through inductive coupling, etc., but a capacitor, with its extremely long lifetime, may be preferable. In one embodiment, an 80 volt, 1000 µF electrolytic capacitor which includes 3.2 Joules, yet is only 16 mm diameter by 40 mm long may be used. The mobile robot 110 may be recharged at its parking position, or at the tape drive when it loads the tape reel 102. In addition, the robot may also obtain power for operation and/or charging via contacting a surface which includes power distribution capability of a type known in the art. The robot may also obtain power for operation and/or control information via a tether.

As shown in FIG. 5B, according to a preferred embodiment, the tape reels 102 are positioned on a floor 304, the surface 302 is opposite the floor 304, and the mobile robot 110 is biased toward the surface 302, such as through magnetic biasing (by using magnets 310), thereby suspending the mobile robot 110 above the tape reels 102. For example, the mobile robot 110 may be magnetically biased toward the upper surface 302.

Figure 6A:
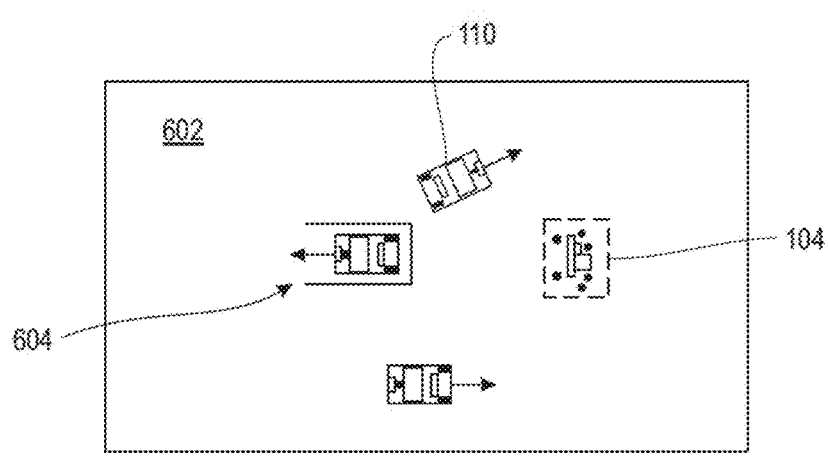
FIGS. 6A-6B are simplified views of a tape library using mobile robots, according to one embodiment.
Figure 6B:
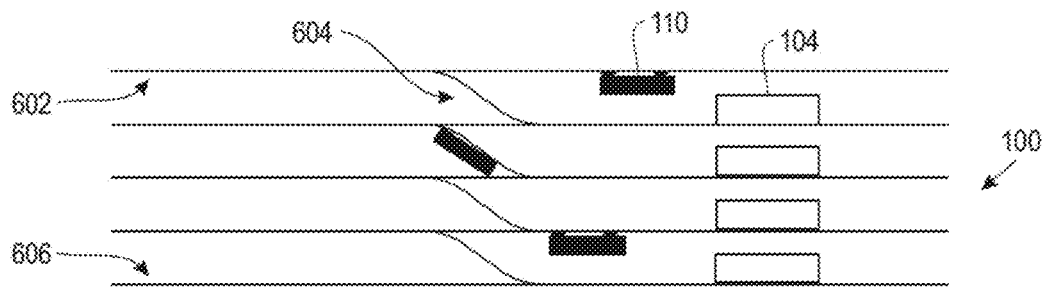

As shown in FIGS. 6A-6B, a library controller may communicate with the mobile robots 110 by light, such as infrared (IR); radio frequency (RF); etc., and may be differentiated on each level of the Linear Media Storage Module 100 to avoid cross-talk. The library controller computes a path the mobile robot 110 is to take to pick up and drop off the tape reels and load the tape reels in the tape drives 104. The mobile robot 110 may servo along the path by using its cameras, in one approach, or it may use encoders on its motors or wheels to servo, using the cameras only for fine adjustments, in another embodiment.

In one embodiment, the Linear Media Storage Module 100 may comprise a plurality of tape drives 104, where each tape drive 104 is positioned on the floor supporting the tape reels, the floor being below the surface on which the mobile robots 110 maneuver by a distance sufficient to allow movement of the mobile robots 110 therebetween (between the tape reels and the surface).

In large multilayer Linear Media Storage Modules 128, mobile robots 110 may move between floors using ramps 604. This enables the mobile robots 110 themselves to load different floors with tape reels, and to rebalance the work load by optimally locating the mobile robots 110 and organizing the tape reels. The relative number of mobile robots 110, tape reels, and tape drives 104 may be determined by the access frequency of the files, data, etc.

According to one approach, multiple surfaces having a spaced and stacked configuration may be used, and the mobile robot 110 is configured to travel between the multiple surfaces. In this approach, at least one ramp 604 may be provided, connecting at least two of the multiple surfaces, thereby permitting the mobile robot 110 to travel between the multiple surfaces. In various approaches, there may be no cable coupled between the mobile robot 110 and any other component of the system, thereby facilitating travel of the mobile robot 110 between the multiple surfaces.

As illustrated in FIG. 6B, according to one embodiment, one or more tape drives 104 may be secured directly to the floors 606 of a Linear Media Storage Module 100 having one or more levels. In addition, the mobile robots 110 may be attracted to the ceilings 602. In this design, the drive(s) 104 may be easily positioned at any location in the Linear Media Storage Module 100 by simply leaving space in the array of reels (not shown). This arrangement facilitates reconfiguration of the Linear Media Storage Module 100 after it has been manufactured, along with replacement of failed tape drives should they occur. For example, the mobile robots 110 may be adapted for moving and/or relocating a tape drive 104. At least one tape drive 104 may be positioned on each level of the Linear Media Storage Module 100, according to one embodiment.

The library can be configured to have "spare" tape drives 104 and mobile robots 110 ready to be put into use upon failure of other tape drives and mobile robots, according to one embodiment. In another embodiment, when extra tape drives 104 or mobile robots 110 are to be used, due to some factor, such as an increased work load, failed mobile robots and/or tape drives, etc., the Linear Media Storage Module 100 may allow adding or removing tape drives, tape reels, and/or mobile robots by the user after manufacture of the Linear Media Storage Module 100.

As mentioned above, conventional tape libraries implement tape cartridges for storing tape in a tightly packed array. However, any portion of the tape cartridge volume that does not contain a tape stored therein creates an overhead penalty, reducing the overall volumetric data density of the system.

In contrast to such conventional products, a clip may be implemented in combination with a tape reel according to any of the embodiments described and/or suggested herein. Moreover, the clip may serve the dual purpose of protecting tape stored on the tape reel, and facilitating the tape end transfer, e.g., to a tape drive, without incurring a volumetric overhead penalty. As a result, the tape reels may be stored within a tightly packed array, e.g., as shown in FIG. 1, and yet be protected with minimal volumetric overhead.

FIGS. 7A-7D depict a product 700, in accordance with one embodiment. As an option, the present product 700 may be implemented in conjunction with features from ally other embodiment listed herein, such as those described with reference to the other FIGS. Of course, however, such product 700 and others presented herein may be used in various applications and/or in permutations which may or may not be specifically described in the illustrative embodiments listed herein. Further, the product 700 presented herein may be used in any desired environment. Thus FIGS. 7A-7D (and the other FIGS.) should be deemed to include any and all possible permutations.

Figure 7A:
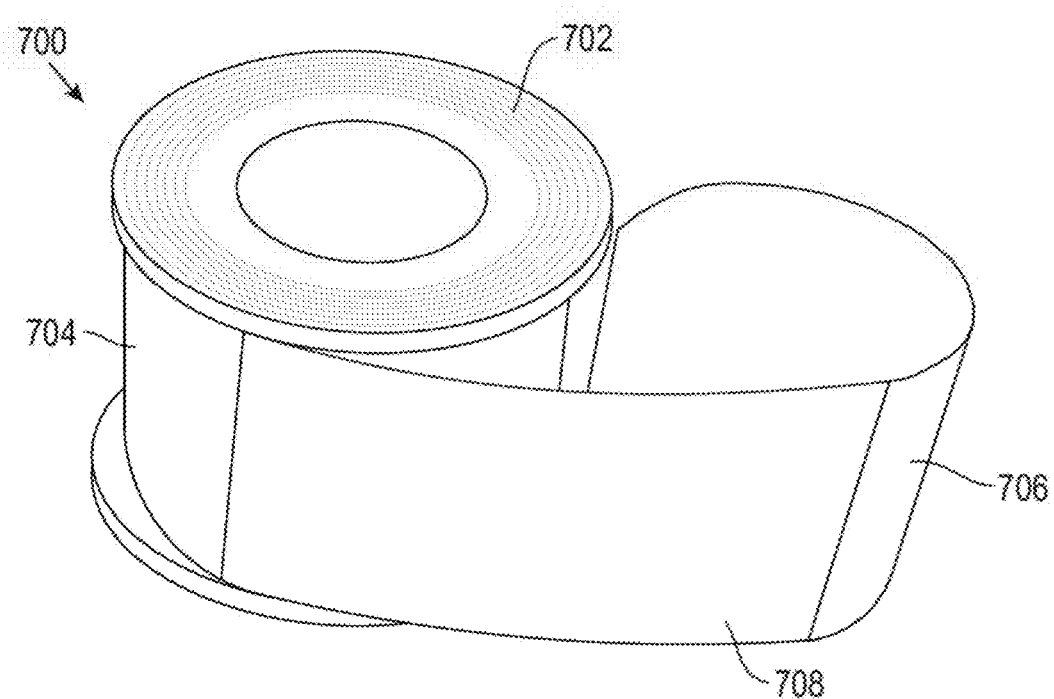
FIGS. 7A-7D are perspective views of a product, according to one embodiment.
Figure 7B:
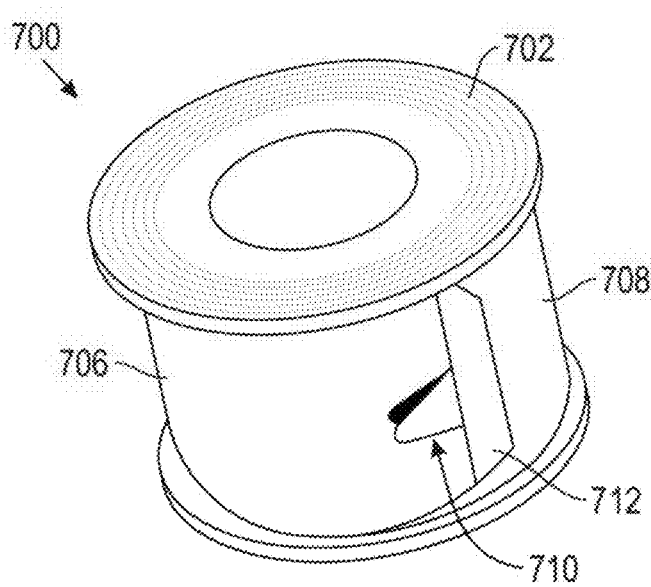

Looking to FIGS. 7A-7B, the product 700 is illustrated as having a reel 702. Depending on the embodiment, the reel 702 may be a device, such as a cylinder, spool, frame, etc. that is rotatable about an axis, e.g., when mounted on a chuck, and is used for winding and storing tape, film, or other flexible materials, as will soon become apparent. Moreover, according to other approaches, the reel 702 may include any of the embodiments described herein with reference to reel(s) 102 of various FIGS.

With continued reference to FIGS. 7A-7B, the product 700 also includes a tape 704 coupled to the reel 702. The tape 704 may be a conventional tape of any type, preferably a magnetic recording tape, but is not limited thereto. Moreover, according to various approaches, the tape 704 may be coupled to the reel 702 using any conventional method, e.g., a bonding agent, fastener, a groove, etc.

Additionally the product 700 includes a spring-like clip 706 which is coupled to a free end of the tape 704. With reference to the present description, the "free end" of the tape 704 is defined as the end of the tape 704 that is unwound from the reel 702 first. In other words, the free end of the tape 704 is the end of the tape 704 which is opposite the end coupled to the reel 702, as described above. Thus, one end of the tape 704 is preferably coupled to the reel 702, while the other end of the tape 704 (the free end) is coupled to the spring-like clip 706.

Figure 7C:
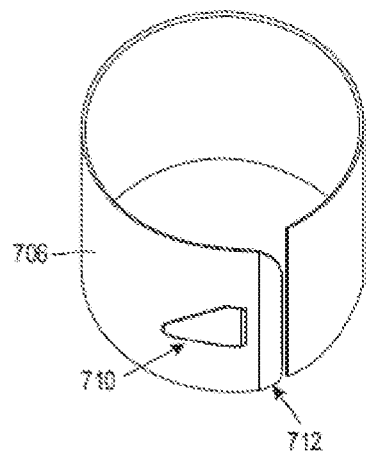
Figure 7D:
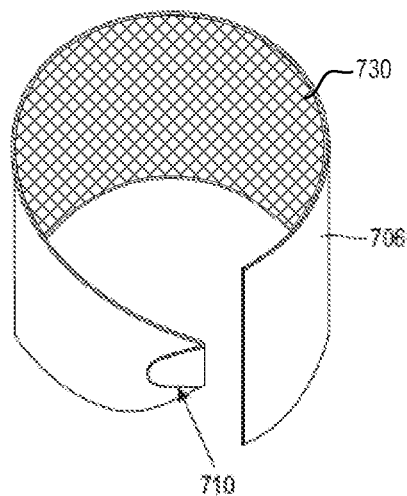

Moreover, it should also be noted that "spring-like" is intended to mean that at least a portion of the clip 706 is resiliently deformable. Thus, under zero external tension, the clip preferably returns to its at rest shape, e.g., a rounded shape as shown in FIGS. 7C-7D. Moreover, by applying tension of about 0.5 Newtons (N) to about 1 N, e.g., similar to the values observed in exemplary tape transport systems, the resiliently deformable characteristic of the clip may be counteracted, thereby deforming the clip 706 from its rounded shape to enable transferring to a take-up reel (e.g., see 810 of FIGS. 8B-8D).

This resiliently deformable characteristic may result from different designs and/or materials used to form the spring-like clip 706. Specifically, the durability of the clip 706 material preferably allows a sufficient number of deformations (e.g., above 100,000) while retaining the ability to rebound to a rounded shape. Additionally, the design of the clip 706 preferably results in embodiments of the clip 706 having low inertia values, thereby allowing for the clip 706 to be used in a high-speed, high-throughput storage system.

According to an exemplary embodiment, which is in no way intended to limit the invention, the strain for fully straightening a clip having a thickness of about 0.05 mm, and a 19 mm diameter is about $1.3 \times 10^{-3}$. Furthermore, a steel clip with a Young's modulus of about 200 GPa, the stress associated with this strain may be about 260 MPa. If the stress in the clip is less than 40-60% of the ultimate tensile strength, the clip will not fail from fatigue. However, this stress value is well below the yield strength of most resiliently deformable materials. Moreover, coupling a clip to and/or decoupling a clip from a tape reel preferably does not include fully straightening the clip against the clip's bias towards a rounded shape, but may include the clip assuming a relatively less-curved geometry when pulled by an engagement feature, thereby permitting the clip to be passed to a take-up reel. Thus, the actual stress exerted on the clip in various embodiments described herein is preferably lower than the yield strength of the resiliently deformable materials used in the various clips.

According to some approaches, the clip 706 may include a metal such as steel, e.g., PH 15-7 steel, PH 17-7 steel, spring steel, 300 series stainless steel etc.; CuBe; etc. However, in other approaches, the clip 706 may include a moldable plastic, and/or any other resiliently deformable material. Moreover, in some approaches, thermal treatment may be performed on the clip material in the desired shape of the clip 706, thereby helping attain the appropriate spring-like properties of the clip 706. In further approaches, the clip 706 may be magnetically permeable to protect the underlying tape from stray magnetic fields.

In different approaches, the clip 706 may be coupled to the free end of the tape 704 using any of the methods described above for coupling the tape 704 to the reel 702. However, in a preferred approach, the clip 706 may be coupled to the free end of the tape 704 in a manner that would prevent the junction between the tape and the spring-like clip 706 from causing damage to the tape. Thus, according to an illustrative embodiment, the clip 706 may be coupled to the free end of the tape 702 by a tape leader 708, e.g., using an adhesive.

Looking to FIG. 7B, the tape leader 708 may serve as a protective layer between the clip 706 and the tape 704, e.g., when the tape 704 is wound on the reel 702. Thus, according to one approach, once the tape 704 has been wound onto the reel 702, the tape leader 708 may be wrapped over the tape 704 before the clip 706 is positioned in a wrapped position, whereby the clip 706 may be placed over the tape leader 708, as will be described in detail below.

It follows that the tape leader 708 may have a length, as measured between the clip 706 and the tape 704, of at least one circumference of an outer surface of the tape 704 when the tape 704 is wound completely on the reel 702. Moreover, the tape leader may have a preferred width that is about the same dimension as the average width of the tape to which the tape leader 708 is coupled. Thus, the tape leader 708 may be able to cover the whole outer surface of the tape 704, when wound on the reel 702. However, according to other approaches, the tape leader 708 may have a length and/or width that is shorter or longer than the aforementioned dimensions, depending on the desired embodiment.

The tape leader 708 preferably includes a flexible material, e.g., such that it may be wrapped onto the reel in a similar fashion as the tape. However, according to various embodiments, the tape leader 708 may be made of any conventional materials e.g., that would not cause damage to the tape when coming into contact therewith, as would be appreciated by one skilled in the art upon reading the present description. Moreover, depending on the desired embodiment, the tape leader 708 may have a thickness from about 0.013 mm to about 0.064 mm, but could be higher or lower depending on the desired embodiment.

With continued reference to FIGS. 7A-7B, as briefly mentioned above, the clip 706 may be selectively positionable in a wrapped position. Looking to FIG. 7B specifically, when the clip 706 is in a wrapped position, the clip 706 may wrap around at least a portion of the tape 704, when the tape 704 is wound onto the reel 702, thereby holding the portion of the tape 704 in place on the reel 702. Depending on the embodiment, the portion of the tape 704 may be some or all of an outer circumference of the tape 704 on the reel 702. This desirably minimizes and/or eliminates any volumetric storage overhead, and allows a mechanism to access any reel within a tightly packed array, e.g., as shown in FIG. 1.

Referring again to FIG. 7B, it follows that the clip 706 may have different lengths, depending on the desired embodiment, e.g., depending on the portion of a tape 704 being held by the clip 706 and/or the size of a given tape when wrapped on a reel. According to one approach, the length of the clip 706, as measured between a free end of the clip and an end of the clip coupled to the tape 704, may be at least one-half a circumference of an outer surface of the tape 704 when wound completely on the reel 702. However, according to another approach, the length of the clip 706 may be greater than a circumference of an outer surface of the tape 704 when the tape 704 is wound completely on the reel 702.

Furthermore, according to other approaches, the width of the clip 706, as measured perpendicular to its length, may also vary, depending on the desired embodiment. Thus, according to various embodiments, the width of the clip 706 may be in a range from about 20% of a width of the tape 704 to about 100% of a width of the tape 704, as measured in the same direction as the width of the clip 706. Such embodiments may allow the clip 706 to be positioned within the reel flanges when positioned in a wrapped position.

According to yet another embodiment, the width of the clip 706 may be greater than a width of the tape 704, as measured in the same direction, e.g., thereby providing more protection for the tape 704. In such an approach, the clip 706 may encircle the outer edges of the reel flanges. However, in another approach, e.g., as shown in FIG. 7G, the reel flanges 720 may include grooves 722 for receiving the clip 706, e.g., such that the tape 704 is effectively sealed in therebelow.

The dimensions, e.g., the width and/or length, of the clip may depend on the size of a given tape when wrapped on a reel. For example, a clip designed to wrap around about a full circumference of an outer surface of a first tape may have a length and/or width different from that of a clip designed to wrap around about a full circumference of an outer surface of a second tape. Thus, dimensions of the embodiments described and/or suggested herein are not to be limited to any one tape storage platform, but rather are intended to include any tape and/or tape reel design available in the industry.

With continued reference to FIGS. 7A-7D, as alluded to above, the clip 706 preferably has spring-like characteristics, e.g., such that at least a portion of the clip 706 is resiliently deformable. The spring-like characteristics of the clip 706 helps the clip 706 remain in a wrapped position on the reel 702, even in the presence of external vibration and mechanical shock. Thus, the clip 706 may ensure that the free end of the tape 704 is securely held on the reel 702.

In an exemplary embodiment, which is in no way intended to limit the invention, the stiffness of the clip 706 may vary along a length thereof between the free end of the clip and the end coupled to the tape 704 (opposite the free end of the clip). According to one approach, a free end of the clip 706 may have a greater stiffness than an end of the clip 706 coupled to the tape 704. This allows the region of the clip 706 closer to the tape 704 to flex more freely, thereby beneficially reducing the bending experienced at the interface of the clip 706 and the tape 704. As a result, this varied stiffness of the clip 706 may desirably reduce the wear experienced by the tape 704, which may otherwise result from placing the clip 706 into a wrapped position (e.g., see 7A), and removing it therefrom (e.g., see FIG. 7A).

According to one approach, the varied stiffness of the clip 706 as described above may result from the clip 706 having a varied thickness, e.g., tapered thickness, along its length, where larger thickness of the clip corresponds to greater stiffness values thereof. According to various embodiments, the thickness of the clip 706, e.g., anywhere along the length thereof, may be from about 0.025 mm to about 0.51 mm, but may be higher or lower depending on the desired embodiment, material of construction (e.g., plastic material may be thicker than a metal design), etc. Thus, according to an exemplary embodiment, which is in no way intended to limit the invention, the free end of the clip 706 may have a thickness of about 0.20 mm, while the end of the clip 706 coupled to the tape leader 708 may have a thickness of about 0.05 mm, where the thickness of the clip is gradually tapered about evenly from the free end of the clip 706 to the opposite end thereof, coupled to the tape leader 708.

In addition to tapering the thickness of the clip 706, other designs may be incorporated to reduce wear experienced by the tape 704, depending on the desired embodiment. According to one approach, at least one surface of the clip 706, and in some approaches both surfaces of the clip 706, may have a surface feature (e.g., see 730 in FIG. 7D) for reducing surface friction of the clip 706 between the clip 706 and an abutting surface, e.g., the tape 704 and/or the tape leader 708, e.g., by reducing the surface area of the clip 706 in contact with the tape 704 and/or tape leader 708. The surface feature may include any number or type of textures, patterns, material combinations, voids, etc. that may desirably reduce the surface friction of the clip 706 and/or facilitate clip unloading. Moreover, the surface feature of the clip 706 may be formed using molds, stamps, etching, etc., depending on the desired embodiment.

Additionally, as illustrated in FIGS. 7B-7C, a free end of the clip 706, which is opposite the end of the clip 706 coupled to the tape 704, may have a bent portion 712, which preferably angles away from the tape when the clip is in a wrapped position around the spooled tape. Depending on the preferred approach, the bent portion 712 may be for at least one of, enabling optical detection of the bent portion 712, and keeping the free end of the clip 706 off of the tape 704, thereby preventing damage to the tape 704 caused by an edge of the free end of the clip otherwise coming into contact with the tape thereunder. Thus, according to an illustrative approach, to enable optical detection of the bent portion 712, a tape drive (e.g., see 104 of FIG. 1) may include an optical detector, which is preferably able to detect an optical signal reflected off the bent portion 712 of the clip 706, as will be discussed in detail below.

Figure 7E:
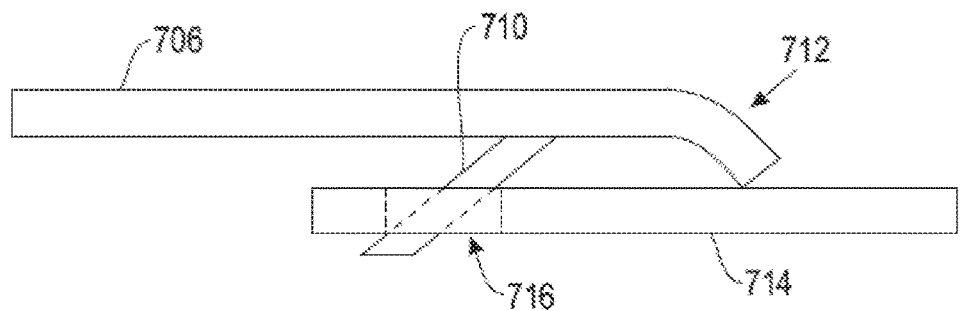
FIG. 7E is a representational in use diagram, according to one embodiment.

Furthermore, according to additional approaches, the bent portion 712 may also assist in preventing the free end of the clip 706 from catching on a transfer mechanism (e.g., see FIG. 7E). The bent portion 712 may also assist in preventing bowing of the clip 706 during engagement and/or disengagement of the clip 706 to and from a transfer mechanism.

Looking still to FIGS. 7A-7D, the clip 706 also includes an engagement feature 710. According to a preferred approach, the engagement feature 710 may be designed to enable the clip 706 to be pulled from the wrapped position, thereby decoupling the clip 706 from the wound body of tape 704, and allowing the tape 704 to be unwound from the reel 702, e.g., as shown in FIG. 7A.

The engagement feature 710 preferably enables high speed automated engagement and/or disengagement of the clip 706 from the reel 702. Thus, the engagement feature 710 is preferably able to be easily and reliably engaged by a mechanism (e.g., a transfer mechanism) to disengage of the clip 706 from the reel 702, and transfer the clip 706 onto a take-up reel, e.g., see 810 of FIGS. 8B-8D. This engagement may also be easily reversed when unloading the clip 706 from the take-up reel, and engaging it back onto the reel 702.

Figure 7F:
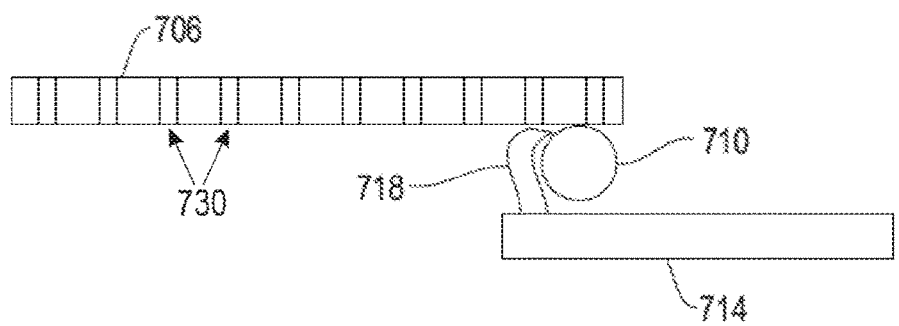
FIG. 7F is a representational in use diagram, according to one embodiment.
Figure 7G:
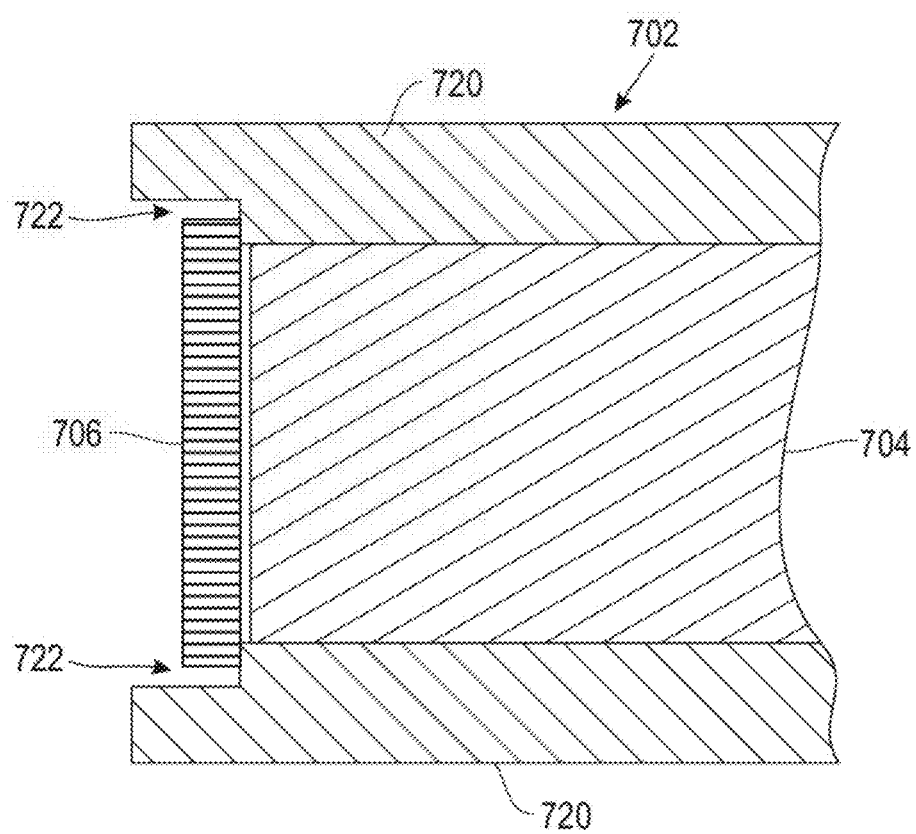
FIG. 7G is a partial cross sectional view of a product, according to one embodiment.

According to some approaches, the engagement feature 710 may include at least one of a hole and a barb (e.g., see FIG. 7F). However, in other approaches, the engagement feature 710 may be a bent portion of the spring-like clip 706 (e.g., see FIG. 7F). For example, as illustrated in FIG. 7C, the engagement feature 710 may be a barb protruding from the curved surface of the clip 706, formed e.g., by punching a tab from the bulk material of the clip 706.

In still further approaches, the engagement feature 710 may include a barb or hook formed by folding a portion of the clip 706 back towards itself, e.g., as depicted in FIG. 7D. In such approaches, the engagement feature 710 may thereby act as the bent portion 712 illustrated in FIGS. 7B-7C, in that, the portion of the clip 706 folded back towards itself to form the engagement feature 710 may enable optical detection thereof. According to various approaches, the engagement feature may have a length of about 0.05 in to about 0.125 in, as measured from the surface of the clip, but may be shorter or longer, depending on the desired embodiment.

Various types of tape threading systems known in the art may be adapted for use with the products and/or systems described herein, according to various embodiments. For example, if tape reels are used individually (not as pairs), a standard threader mechanism may be used to thread the tape reel onto the tape drive, according to one embodiment. Moreover, for tape reels having a spring-like clip, a threader mechanism capable of removing the spring-like clip before accessing the tape may preferably be used, as will soon become apparent.

According to various embodiments, an engagement feature may be used to assist in the coupling and/or decoupling of a clip from a wound body of tape. As described above, a transfer mechanism may be usable to engage and/or disengage a clip from a reel using an engagement feature of the clip. FIGS. 7E-7F illustrate representational in-use diagrams of exemplary transfer mechanisms 714 which are in no way intended to limit the invention.

Looking to FIGS. 7E-7F, the transfer mechanism 714 may have a different design depending on the design of the engagement feature 710. As illustrated in the in-use diagram of FIG. 7E, the transfer mechanism 714 includes a cutout 716 which the engagement feature 710 of the clip 706 is able to engage. According to one approach, the cutout 716 of the transfer mechanism 714 may extend all the way through the transfer mechanism 714, as illustrated in FIG. 7E. However, according to other approaches, the cutout 716 may extend only partially through the transfer mechanism 714, e.g., similar to a notch in which the engagement feature 710 may be fixed when under tension.

Furthermore, it should be noted that the bent portion 712 of the clip 706 is illustrated as preventing the transfer mechanism 714 from becoming wedged between the body of the clip 706 and the engagement feature 710. As described above, this desirably prevents the transfer mechanism 714 from becoming unable to disengage the engagement feature 710, thereby preserving the functionality of the system in which the transfer mechanism 714 and/or engagement feature 710 are located.

According to another approach, FIG. 7F illustrates a transfer mechanism 714 which includes a hook-like member 718. In a preferred approach, the hook-like member 718 of the transfer mechanism 714 is designed to engage the barb-like engagement feature 710 of the clip 706, as depicted.

As previously mentioned, the representational in use diagrams shown in FIGS. 7E-7F may be implemented in a system, preferably having a tape drive. FIGS. 8A-8D illustrate systems having a tape drive 104 which incorporates such engagement features (e.g., see 710 of FIG. 7), according to two different embodiments. As an option, the present systems may be implemented in conjunction with features from any other embodiment listed herein, such as those described with reference to the other FIGS. Of course, however, such systems and others presented herein may be used in various applications and/or in permutations which may or may not be specifically described in the illustrative embodiments listed herein. Further, the systems presented herein may be used in any desired environment. Thus FIGS. 8A-8D (and the other FIGS.) should be deemed to include any and all possible permutations.

Figure 8A:
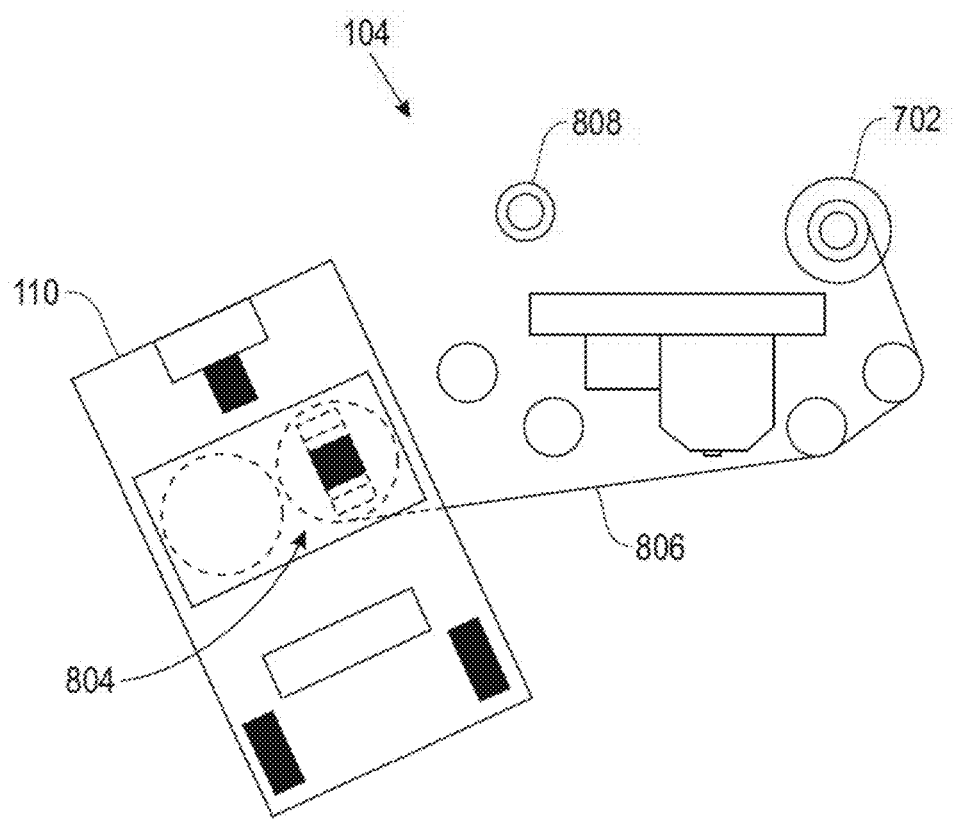
FIGS. 8A-8D are schematic representations of tape threading using a mobile robot, according to one embodiment.

Referring now to FIG. 8A, the system includes a tape drive 104 which itself may have no threader. Rather, a mobile robot 110 may be configured to thread tape 806 of the retrieved tape reel 702 onto the tape drive 104. In one approach, a mobile robot 110 loads the tape 806 provided on a pair of tape reels 804, 804, by first dropping off one reel 702 on the tape drive 104, and then the other reel 804 on a reel chuck 808, for which a reel motor may wind the tape 806. Alternately, if the tape 806 is stored on one reel only (such as reel 702), the mobile robot 110 may move an end of the tape not on the reel 702 to secure it to the inboard drive wheel, as described in relation to FIGS. 8B-8D. As a result, the precision of the mobile robot 110 motion is much greater than that of a leader pin loader mechanism as used in conventional products.

Figure 8B:
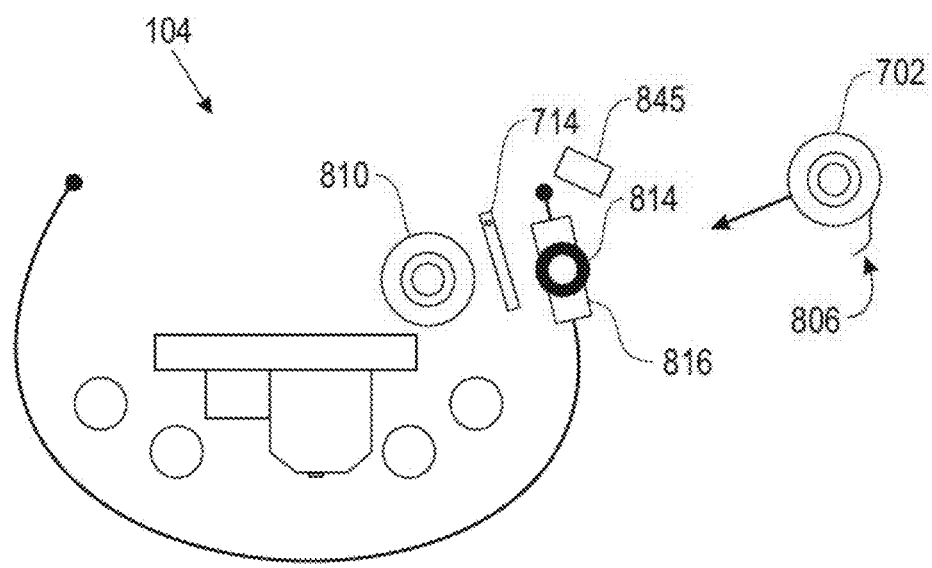
Figure 8C:
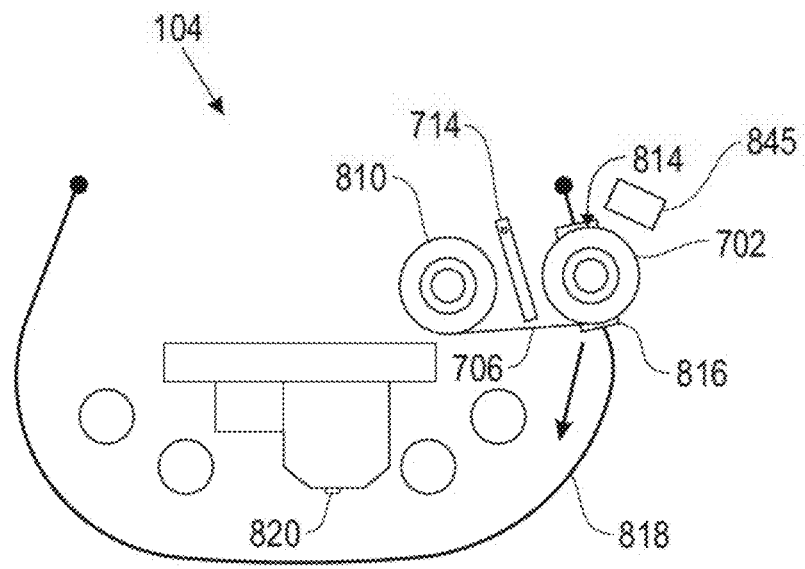
Figure 8D:
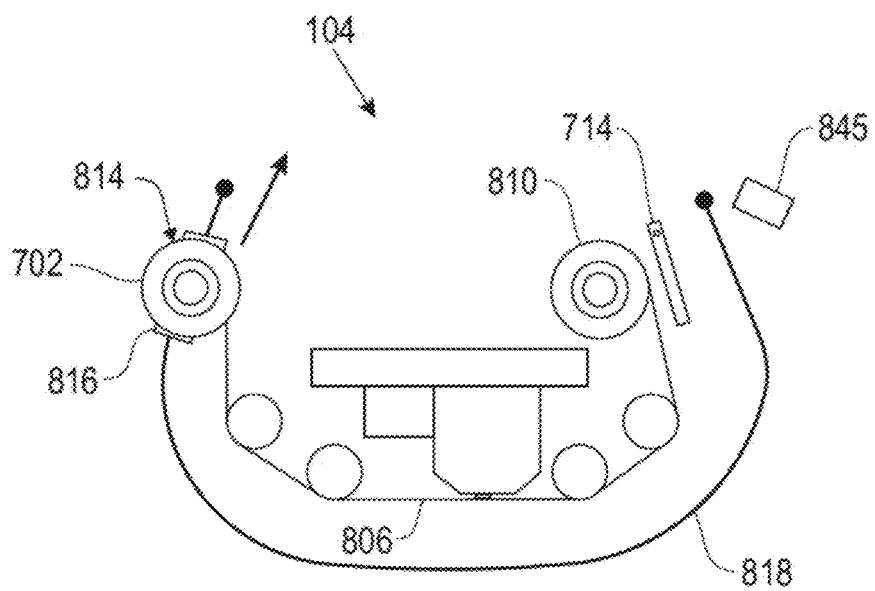
Figure 8E:
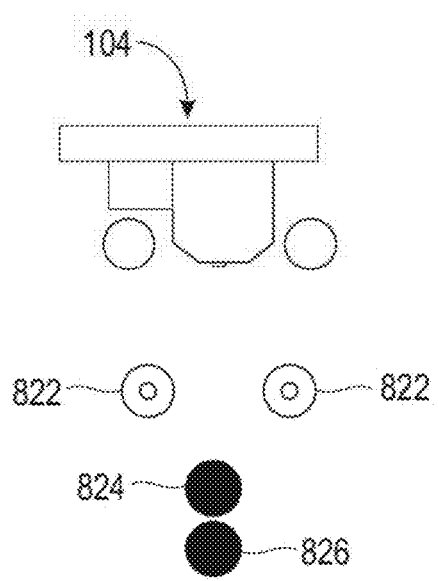
FIGS. 8E-8H are schematic representations of steps for tape self-threading using a tape drive, according to one embodiment.

In another embodiment, as shown in FIGS. 8B-8D, a single reel 702 of tape 806 may be loaded onto a reel chuck 814 and motor, e.g., for rotating the reel 702, which are fixed to a carriage 816 that is adapted to follow a guide 818 that allows for motion of the chuck 814 around the tape drive 104 to facilitate threading of the tape 806. Before loading the reel 702 on the chuck 814, the chuck 814 is brought into proximity of the inboard (take-up) reel 810, as shown in FIG. 8B. After the mobile robot (not shown for clarity) places the reel 702 on the chuck 814, a mechanism 714 attaches the end of the tape 806 to the take-up reel 810. See FIG. 8C. At this point, the tape 806 may be transferred between reels 802 and 810 as part of a preliminary locate operation, before the tape 806 contacts the recording head 820 or any guide surfaces, such as rollers, thus enabling faster tape locate with reduced tape damage and drive wear.

In a further approach, during the loading process described above, it may be beneficial to detect the rotational orientation of the reel 702, e.g., such that an engagement feature of a clip coupled to the reel 702 may be located. This location may be accomplished using a beam of light that is reflected off of a feature on the clip. This feature may include a small reflector positioned at an angle with respect to the circumference of the clip that reflects the light beam into a detector, e.g., a bent portion 712 as presented in FIGS. 7B-7C.

Therefore, according to one approach, an optical detector 845, of a type known in the art, may be used as a part of the process of attaching the end of the tape 806 to the take-up reel 810, as described above. The optical detector 845 is preferably used for detecting an orientation of a clip having a bent portion 712 and/or the engagement feature 710, e.g., as described above with reference to FIGS. 7A-7D.

Referring still to FIG. 8C, as the chuck 814 rotates the reel 702, the optical detector 845, and/or a light source (not shown), may emit an optical signal towards a clip coupled to the reel 702. Moreover, as the reel 702 is rotated to the point that the optical signal hits a portion of a clip (e.g., the bent portion 712 and/or the engagement feature 710 of FIGS. 7A-7F) wrapped around the reel 702, light is reflected back at the optical detector 845. The optical detector 845 is preferably able to detect the reflection, thereby locating the bent portion and/or the engagement feature of the clip. This information assists in the process of threading the tape 806 of the retrieved tape reel 702 onto the tape drive 104.

According to one approach which is in no way intended to limit the invention, the mechanism 714 may be a transfer mechanism for engaging an engagement feature of the clip. Once the transfer mechanism has engaged the engagement feature, it may pull the clip from the wrapped position on the tape reel 702 as described above, and load the clip onto the take-up reel 810, all of which preferably occurs in less than about 100 milliseconds, but could be slower. Upon loading the clip onto the take-up reel 810, a winding process may initiate, e.g., to perform a preliminary locate operation, as described above. This rapid operation of the loading and/or unloading of a clip imposes additional forces on the clip that may be taken into account when designing the thickness, length, material composition, etc. of the clip, depending on the desired embodiment.

Moreover, in other approaches, the system may include a controller (e.g., see 228 of FIG. 2), coupled to at least the optical detector 845, that may assist in the preliminary locate operation.

Looking now to FIG. 8D, the chuck 814, reel motor and tape reel 702 are moved along the guide 818 to a final position, where the tape 806 may be read from and/or written to.

In another embodiment, rather than moving the library reel 702 and carriage 816, the take-up reel 810 and its motor may be moved to thread the tape drive 104. In yet another embodiment, if the tape 806 is stored on a pair of reels, the mobile robot may position the two reels directly on the tape drive 104, where the tape 806 may be located before threading.

However, as described above, an alternative approach to storing a tape on a single reel is to use a pair of reels. Storing the tape on pairs of reels has an advantage in that after loading, the tape is ready to be used and does not need to be wound onto another inboard reel. Also, when the tape is finished being used, both reels may be removed with the tape, and the tape does not need to be unwound from the inboard reel in order to be removed.

Figure 8F:
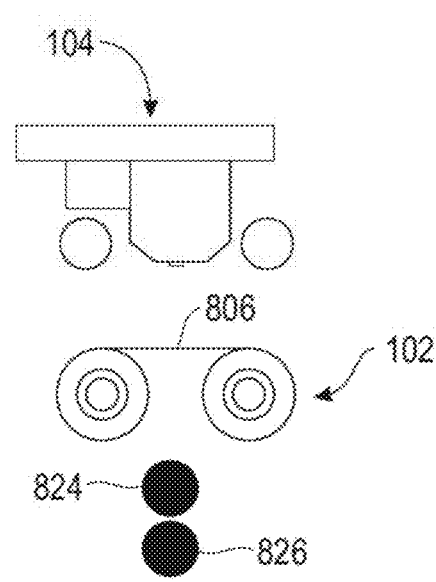
Figure 8G:
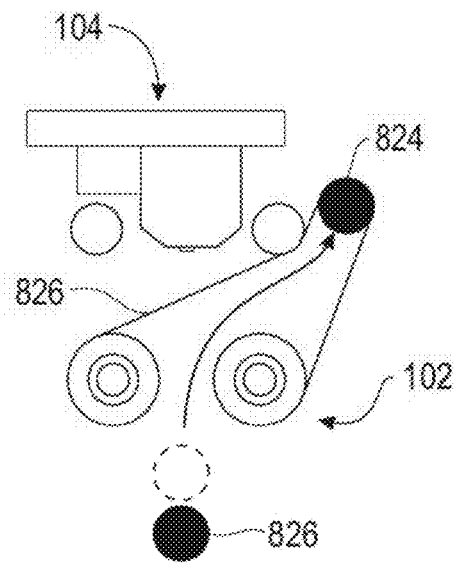
Figure 8H:
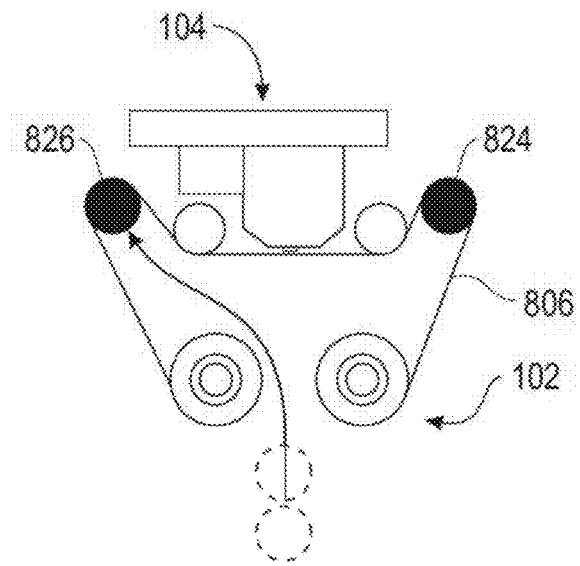

According to another exemplary embodiment, as shown in FIGS. 8E-8H, the tape 806 may be held on two tape reels 102, and a method may be used which avoids the unreliability of a leader pin. In this approach, the reel drive chucks 822 may be spaced with the same close spacing of the tape reels 102 in their storage position. The mobile robot places the tape reels 102 on the chucks 822, as shown in FIG. 8F, and two moveable rollers 824, 826 sequentially thread the tape 806 in position. First, roller 824 threads the tape 806, as shown in FIG. 8G, and then roller 826 threads the tape 806, as shown in FIG. 8H. The tape 806 may locate before the rollers 824, 826 move into their final position, thus avoiding the extra wear and control difficulties associated with contact of the tape 806 with the roller 826 or other guide surfaces and the head. Alternately, two smooth cylinders which form air bearings may be used to thread the tape drive, in another embodiment.

According to various embodiments, a new system architecture with increased throughput for random input/output (IO) includes an apparatus for performing read/write or locate operations on a first tape while performing a winding operation (e.g., coarse locate) on a second tape, and is described herein. As a result, the number of data blocks read/written per second by the drive (throughput) may be increased by a factor of two or more, while the cost is kept to a minimum. While a tape drive may be occupied with the essential task of reading and/or writing data from a particular tape, other tapes may also be loading/unloading and locating/unlocating to and from the data position. This function may be assimilated into a process which threads the tape into the drive after prelocating.

Preferably, the system allows for coarse locating of a given tape to a predetermined location without actually having the tape threaded across the read head. Thus, the predetermined location may be arrived at without actually reading the longitudinal position on the tape. According to one approach, this may preferably be achieved by having a plurality of winding stations with the ability to coarse locate a tape, and a mechanism for transferring the tape to the read head to perform fine location as well as read and/or write operations.

As described in some detail above, coarse locating involves winding a tape to a predetermined location, e.g., a reference location. In a preferred approach, a tape drive may include and/or be coupled to memory which may be used to store the location of the data written to the tapes in a tape drive. According to various approaches, the memory may include a lookup table, a controller, random access memory (RAM), etc.

Thus, when conducting a coarse location, the tape drive may utilize the location of the data stored in the memory to wind the tape to the reference location without actually having to read the data on the tape. Rather, a coarse location is preferably determined using the length of tape wound from a reference location. In general, the reference location for a given tape may be at the start of a tape. However, for embodiments having a dual spool configuration where the tape is not rewound on completion of an IO operation, the tape location for a given tape spool pair may be stored as meta-data at the system level. According to one approach, this value may be updated by the fine location determined during the IO operation, such as reading the longitudinal position from the servo information on the tape. Moreover, in various other approaches, this location information may be stored on other media in the system, such as on hard disk, solid state storage, etc. It may also be stored locally to a tape on media including, but not limited to flash coupled to the spool. Further, it may be possible to determine the reference location from the amount of tape on each spool, e.g., using optical detection, inertial detection, etc.

In one approach, a predetermined tape thickness, reference location and the number of rotations (integer and fractional) wound on a given tape spool may be enough information to determine the length of tape that has been unwound to sufficient accuracy to enable a locate operation. Moreover, the length of tape that has been unwound may be compared to the reference location to determine when the reference location has been reached without having to read the data on the tape. According to one approach, a shaft encoder may be used to determine the length of tape that has been unwound. The variation in length of modern recording tape caused by tension, temperature, and humidity is typically less than 1000 parts per million (ppm), which is low enough that according to some approaches, the tape may be accurately positioned using only the number of revolutions. Thus, coarse location preferably results in higher locate speeds. Additionally, coarse location allows for the additional advantage of the tape not being in contact with the head, rollers, guides and/or other components of the tape drive, thereby reducing the likelihood of the tape being damaged, as well as reducing wear of the tape drive components.

As described above, a single system, e.g., a tape drive, may simultaneously conduct operations on two or more tapes in a preferred approach. FIGS. 9A-9F depict various view of a system 900 with the capability to perform overlapped operations, in accordance with one embodiment. As an option, the present system 900 may be implemented in conjunction with features from any other embodiment listed herein, such as those described with reference to the other FIGS. Of course, however, such system 900 and others presented herein may be used in various applications and/or in permutations which may or may not be specifically described in the illustrative embodiments listed herein. Further, the system 900 presented herein may be used in any desired environment. Thus FIGS. 9A-9F (and the other FIGS.) should be deemed to include any and all possible permutations.

It should be noted that the system 900 of FIGS. 9A-9F preferably refers to a tape drive system. Furthermore, the system 900 includes a head 902 for performing read and/or write operations. Thus, in one approach the head 902 may include read and/or write transducers, e.g., of a type known in the art. Moreover, according to different approaches the transducers may be in a piggyback, merged, etc. configuration, depending on the desired embodiment.

Furthermore, the system 900 includes a first set of motors 904, 905 for performing positioning operations on a first tape 906, as well as a second set of motors 907, 908 for performing positioning operations on a second tape 910. According to one approach, portions of the first and/or second tapes 906, 910 may be stored on one or more spools (e.g., see FIGS. 1 and 18). However, in another approach, referring again to FIGS. 9A-9F, portions of the first and/or second tapes 906, 910 may be held in cartridges. Moreover, according to various approaches, the tapes of FIGS. 9A-9F, e.g., spools, cartridges, etc., may be delivered to the drive according to any of the approaches described and/or suggested herein. In a preferred approach, the spools may be brought to the drive via robots (see, e.g., 110 of FIG. 1).

In one approach, the first set 904, 905 and/or second set 907, 908 of motors may include a drive and storage reel mounted thereon. Thus, the drive and storage reel of each set may effectively couple the first and second tapes 906, 910 to their respective set of motors. According to one approach, the drive and storage reel may use a drive chuck (e.g., see FIGS. 7-8) to effectively couple the first and second tapes 906, 910 to their respective set of motors, but is not limited thereto.

With continued reference to FIGS. 9A-9F, the system 900 additionally includes a path 914. As illustrated, the path 914, may act as a track, ring, arm rotating on a pivot, etc. along which a first and second drive mechanism 916, 918 are positionable. Thus, the spools and/or cartridges holding portions of the first and/or second tapes 906, 910 may preferably travel along a common path 914 as will soon become apparent.

The first and second drive mechanisms 916, 918 are preferably coupled to, or include, one of the first set 904, 905 and second set 907, 908 of motors, respectively. For example, looking to FIG. 9A, the motor 904, on the first drive mechanism 916, may be coupled to an armature or other receiver for receiving a tape spool on which the first tape 906 is wrapped; while the motor 905 is coupled to a receiver for receiving the end of the first tape 906.

Referring now to FIG. 9B, as the first drive mechanism 916 moves along the path 914, the tape 906 may be selectively positioned over the head 902.

Moreover, as shown in FIG. 9C, in a preferred approach, the drive mechanism 916 may sit as close as possible to the second drive mechanism 918 without coming into contact therewith. As a result, the drive mechanism 916 preferably creates a large wrap angle for the tape 906 across the head 902 and guides 922 (e.g., see 225 of FIG. 2), thereby minimizing the amount of tape reading and/or writing errors, e.g., resulting from tape skew, poor skiving angle, etc.

In use, still referring to FIG. 9C, the motor 905 may begin to wind the tape 906 from the spool on the first drive mechanism 916, while the head reads and/or writes data to the tape 906.

Operation of the second drive mechanism 918 and second set 907, 908 of motors on the second tape 910 is similar to that of the first drive mechanism 916 and first set 904, 905 of motors.

It should be noted that similar operations as in the foregoing example are applicable to the second set 907, 908 of motors in combination with the second tape 910 and drive mechanism 918 as illustrated in FIGS. 9D-9E. Moreover, in another approach, one or more of the tapes may be unlocated (e.g., rewound) while being positioned across the head 902 after being read from and/or written to. Furthermore, depending on the situation, it may be desirable to position one or more of the drive mechanisms along the path 914, e.g., to achieve proper positioning for this process.

According to the embodiments described and or suggested herein, it is desirable, but not required, that the drive mechanisms are asymmetrical. In some approaches, the drive mechanisms may be symmetrical.

Figure 9F:
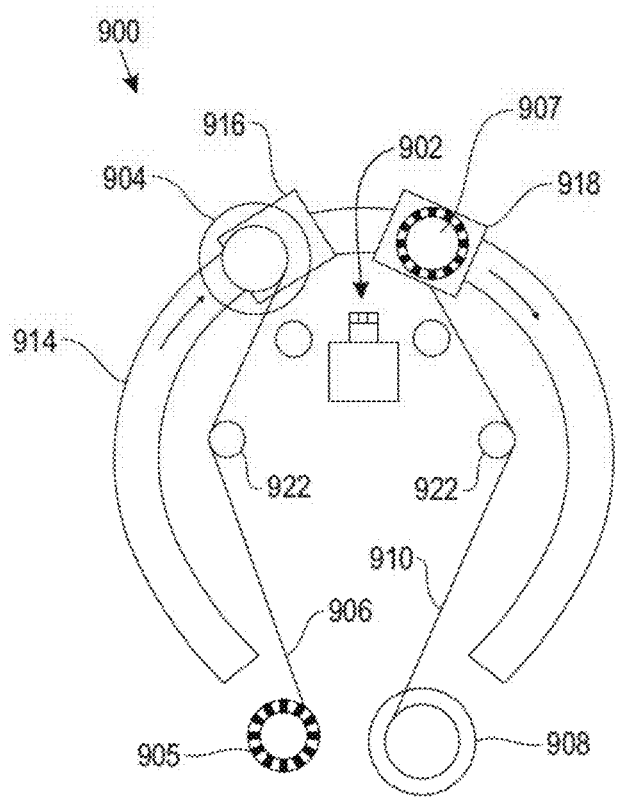

Referring still to the two-tape configuration of FIGS. 9A-9F, the tape drive system 900 exhibits asymmetric drive mechanisms 916, 918. Referring to the present description, asymmetric drive mechanisms 916, 918 are positioned such that they allow for both the first tape 906 and the second tape 910 to be situated such that, as they are positioned over the head 902, the data containing side (e.g., outer facing side of the tape on a spool) of the tape faces the head 902. Thus, as long as the tapes are wound in the counterclockwise direction, such that the data are accessible on the outside of the tape with respect to the spool, cartridge, etc., they may be placed on either drive mechanism and the data containing side of the tape will favorably face the head 902 when wrapped thereover, as illustrated in FIGS. 9C and 9F, respectively. Another way of describing the preferable asymmetric orientation is, for both pairs of reels, the sign (positive or negative) of the relative angular position of the storage versus the drive reel is the same. Thus, in a preferred approach, the drive mechanisms may be asymmetrical.

According to different approaches, the drive mechanisms 916, 918 may move along the path 914 independently of one another using any known mechanism, such as a wheel, a motor, etc. to enable their motion. In one approach, the drive mechanisms are 916, 918 self-propelled. In other approaches, the drive mechanisms 916, 918 may be positioned along the path via an integral positioning system of a type known in the art, such as a conveyer belt, cabling, pivoting arm, etc. Moreover, the drive mechanisms 916, 918 may couple themselves to the path 914 itself when wishing to remain stationary, e.g., via frictional coupling when a tape coupled thereto is being read and/or written to by the head 902. According to various approaches, the drive mechanisms 916, 918 may couple to the path 914 using a gripper, an arm, a break pad that protrudes from below the drive mechanism, etc.

With continued reference to FIGS. 9A-9F, according to various approaches, the path 914 may have different shapes, e.g., arcuate, circular, etc., and/or sizes, depending on the desired embodiment. In another approach, the path of a system may form a closed loop, as will be discussed in further detail below (e.g., see 1320 of FIGS. 13A-13C). The different shapes and/or sizes of the path, in addition to the number of drive mechanisms may change the number of tapes the system may simultaneously access. According to a preferred approach, a compact path is desirable as it may provide high rigidity and small system size and/or enable higher storage density. In preferred embodiments, a large wrap of the tape on the guide surfaces is provided, a factor which tends to lead to less lateral tape motion, enabling higher track density. Thus, according to one approach, the path may include a concave profile (e.g., see FIG. 15), which preferably allows the tape being accessed to have a large wrap angle, while providing a long enough path perimeter to accommodate other potential reels.

The system 900 may also include a processor and logic integrated with and/or executable by the processor. In a preferred approach, the logic may be configured to cause the first set of motors 904, 905 to pass the first tape 906 over the head 902 while simultaneously causing the second set of motors 907, 908 to perform at least one of a coarse locate and a rewind operation on the second tape 910. Thus, according to a preferred approach the path 914 allows a single tape drive system 900 to access two or more tapes simultaneously, thereby overlapping the tape drive operations.

Many tape drive operations can be divided into 5 stages, some of which include multiple steps. These steps and their corresponding stages may include the following.

PRE:
    Load: secure the tape reel to a first of a pair of motors.
    Attach: secure the end of the tape to the second of the pair of motors.
    Locate: advance the tape to the approximate position of the data to read or write thereto.

THREAD: move the drive mechanism to position the tape over the head.

READ/WRITE (RW):
    Accelerate: speed the tape up to the read/write speed.
    Read or write the data.
    Decelerate: slow the tape.

UNTHREAD: move the drive mechanism to remove the tape from the motors.

POST:
    Unlocate, move the tape back onto the tape reel.
    Detach, the secured end of the tape.
    Unload the tape.

As mentioned above, according to different approaches, the steps of the aforementioned stages may not all be included, and in some approaches, they may overlap. For example as the tape is decelerating after being read, it could also be unthreading. According to another approach, the system 900 may also include logic integrated with and/or executable by the processor for causing rewinding of the first tape 906 while a read and/or write operation is being performed on the second tape 910.

With continued reference to FIGS. 9A-9F, it is clear that either of the two tapes 906, 910 may be in any stage of the POST or PRE stages listed above, independent of the state of the other tape. For example, looking to the operations listed above, a first of the two tapes 906 may be loaded while the second tape 910 is loaded or unloaded simultaneously. In yet another example, which is in no way intended to limit the invention, a locate operation may be performed on the first tape 906 while a locate operation is performed on the second tape 910. In a further example, the first tape 906 may be loaded or unloaded while a locate operation is performed on the second tape 910. Thus, in a preferred approach, the first and/or second drive mechanisms 916, 918 may be in communication with the controller, e.g., to receive operating commands. As a result, the first and second drive mechanisms 916, 918 may travel independently, thereby allowing for operations to be overlapped, thereby greatly improving efficiency of the system. The controller preferably controls the movement of the drive mechanisms so that they do not come into contact with each other.

At any given time, only one tape may be positioned over the head to be read from and/or written to. Thus, while the first tape 906 is in RW stage (listed above), the second tape 910 typically cannot be in the THREAD or UNTHREAD stages. However, if coordinated properly (e.g., preferably using the controller), according to an illustrative approach, one tape may be in the process of being threaded while the other tape is in the process of being unthreaded. Looking to FIG. 9F, according to one approach, the system 900 may include logic integrated with and/or executable by the processor for causing threading of the first tape 906 over the head 902 while unthreading the second tape 910 from the head 902. As a result, by simultaneously threading one tape 906 while unthreading the other 910, the access time for the given tape drive system 900 is favorably reduced.

Moreover, the ability to overlap operations provides significant performance benefits when queuing at the system level. According to one approach, queuing may allow operations to be reordered, such as for maximum throughput, even with a single drive. For example, operations can be reordered such that there is minimum idle time at the head, such as by ensuring maximum overlap of locate and unlocate times. In a system with multiple drives, the queuing can be even more effective.

Figure 10:
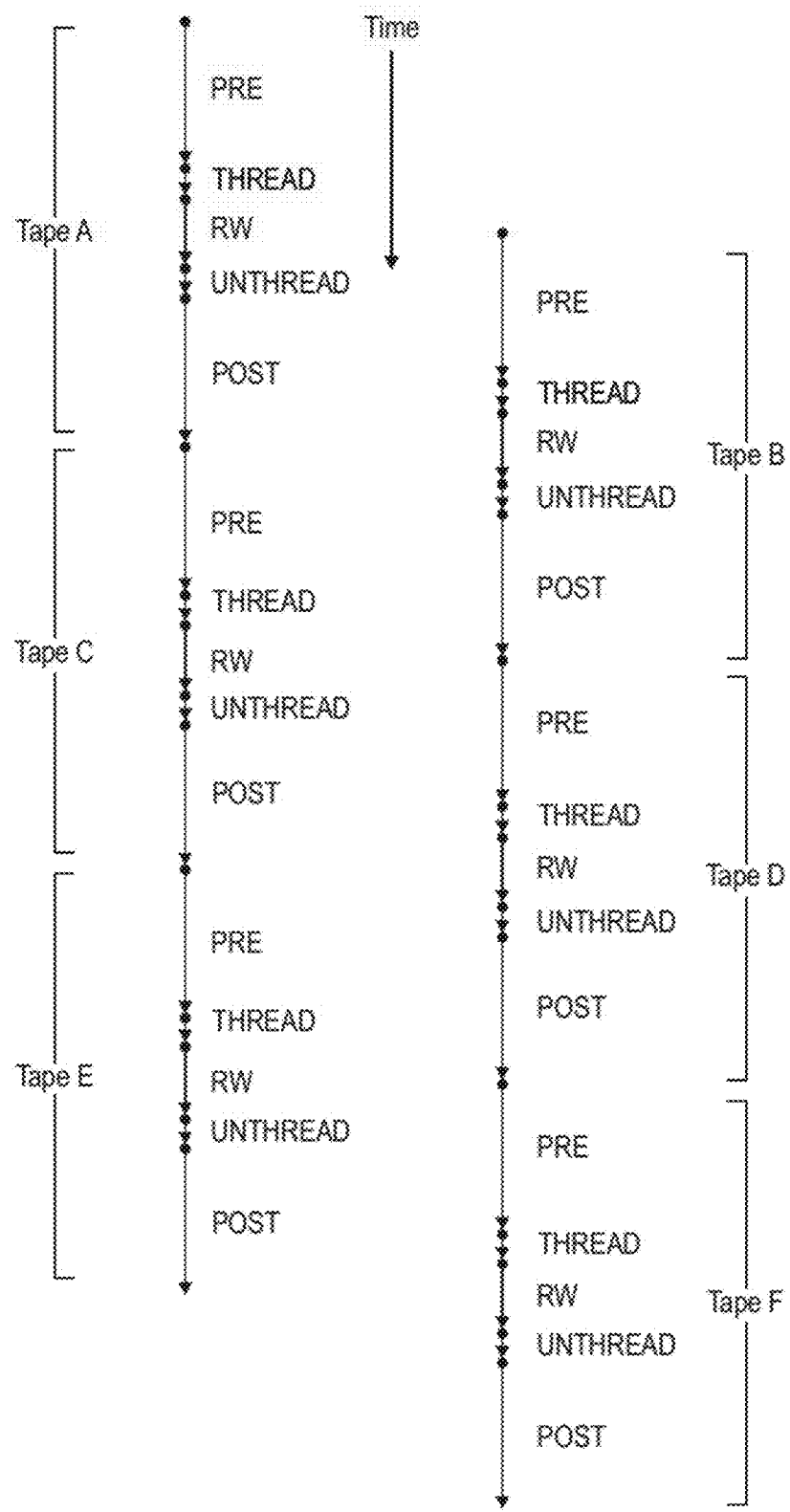
FIG. 10 is a process timing chart for different tapes in a tape drive according to one embodiment.

According to an exemplary embodiment, FIG. 10 illustrates a sequence of operations for a series of tapes listed in alphabetical order from A to F, being read in a drive. As illustrated, two tapes may be in the drive simultaneously such that operations are overlapped. Looking to FIG. 10, Tape A is in the RW and UNTHREAD stages of operation while Tape B is in the PRE stage of operation. Moreover, Tape A conducts POST stage operations while Tape B is conducting THREAD and RW stage operations. Thus, FIG. 10 illustrates that if scheduled properly, the two tapes may be in different stages of the read/write process simultaneously, without interfering. According to the processing and timing conducted in FIG. 10, the throughput of the drive is twice what it would be if only a single tape was in the drive at one time. Thus, overlapping operations of a tape drive is shown as greatly reducing access time.

Figure 11:
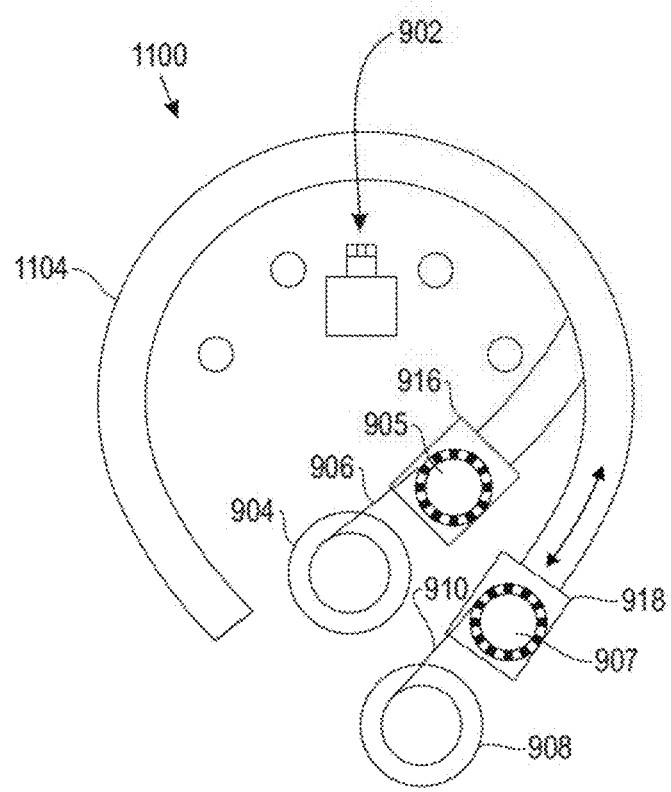
FIG. 11 is a schematic representation of a tape drive having the ability to perform overlapped operations, according to one embodiment.

According to an exemplary embodiment, which is in no way intended to limit the invention, a tape drive system 1100 may include a merged path configuration. FIG. 11 depicts a system 1100, with the capability to perform overlapped operations in accordance with one embodiment. As an option, the present system 1100 may be implemented in conjunction with features from any other embodiment listed herein, such as those described with reference to the other FIGS. Of course, however, such system 1100 and others presented herein may be used in various applications and/or in permutations which may or may not be specifically described in the illustrative embodiments listed herein. Further, the system 1100 presented herein may be used in any desired environment. Thus FIG. 11 (and the other FIGS.) should be deemed to include any and all possible permutations.

As illustrated in FIG. 11, the tape drive system 1100 includes similar features to that illustrated in FIGS. 9A-9F. However, the system 1100 alternatively includes a merged path 1104. The merged path 1104 is preferably designed such that either of the drive mechanisms 916, 918 may position their respective tapes 906, 910 over the head 902. Operations of the tape drive system 1100 may be overlapped. For example while the first tape 906 is being accessed by the head 902, the second tape 910 may be coarse located, rewound, loaded, unloaded, etc. Moreover, according to other approaches, the operations of the system 1100 may be overlapped according to any other approaches described and/or suggested above. Yet, in other approaches, the system 1100 may include longer "runways", e.g., portions of the path 1104 before reaching the merged section, which may be used to partially thread one tape while the other is being unthreaded.

Figure 12A:
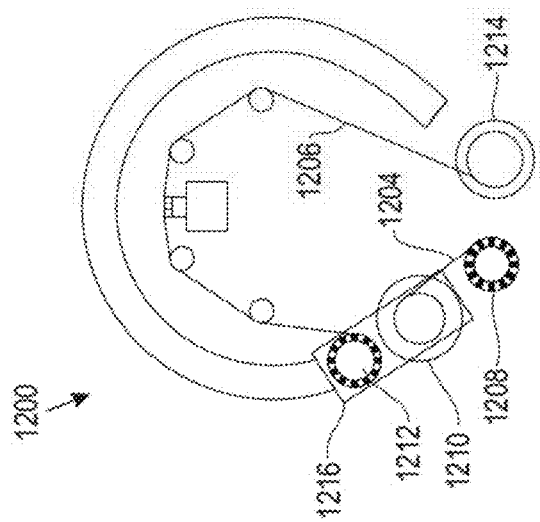
FIGS. 12A-12C are schematic representations of steps for tape self-threading using a tape drive, while performing overlapped operations, according to one embodiment.
Figure 12B:
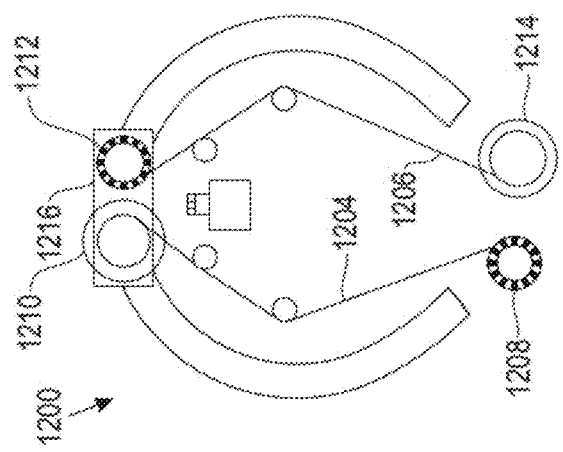
Figure 12C:
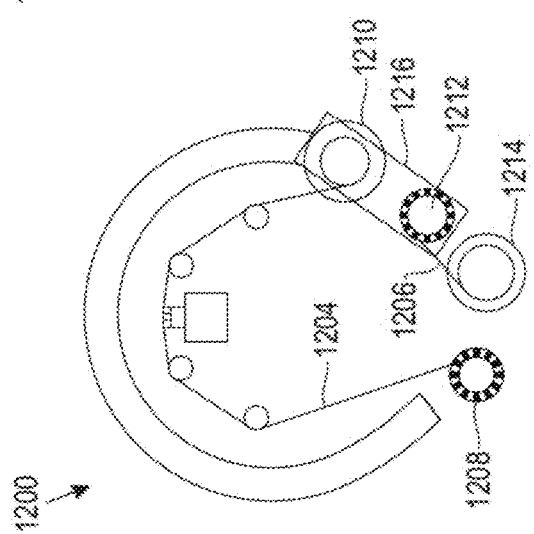

According to another exemplary embodiment, a system 1200 may include only one drive mechanism as illustrated in FIGS. 12A-12C. FIGS. 12A-12C depict a tape drive system 1200 with the capability to perform overlapped operations, in accordance with one embodiment. As an option, the present system 1200 may be implemented in conjunction with features from any other embodiment listed herein, such as those described with reference to the other FIGS. Of course, however, such system 1200 and others presented herein may be used in various applications and/or in permutations which may or may not be specifically described in the illustrative embodiments listed herein. Further, the system 1200 presented herein may be used in any desired environment. Thus FIGS. 12A-12C (and the other FIGS.) should be deemed to include any and all possible permutations.

As depicted in FIGS. 12A-12C, the system 1200 may simultaneously operate on two tapes 1204, 1206 using two pairs of motors 1208, 1210 and 1212, 1214 respectively. Furthermore, as mentioned above, the system 1200 has only one drive mechanism 1216, e.g., compared to the two drive mechanisms illustrated in FIGS. 9A-9F.

Referring again to FIGS. 12A-12C, according to one approach, the single drive mechanism 1216 allows for the system 1200 to be manufactured less expensively while providing functionality similar to embodiments having two drive mechanisms. Although the single drive mechanism 1216 allows only one reel to execute a PRE or POST stage operation at any given time, a RW stage operation for one tape may be executed at the same time that a PRO or POST stage operation is performed for another tape. Additionally, the common drive mechanism 1216 allows for the first tape 1204 to be unthreaded while the second tape 1206 is threaded, or vice versa.

Figure 13C:
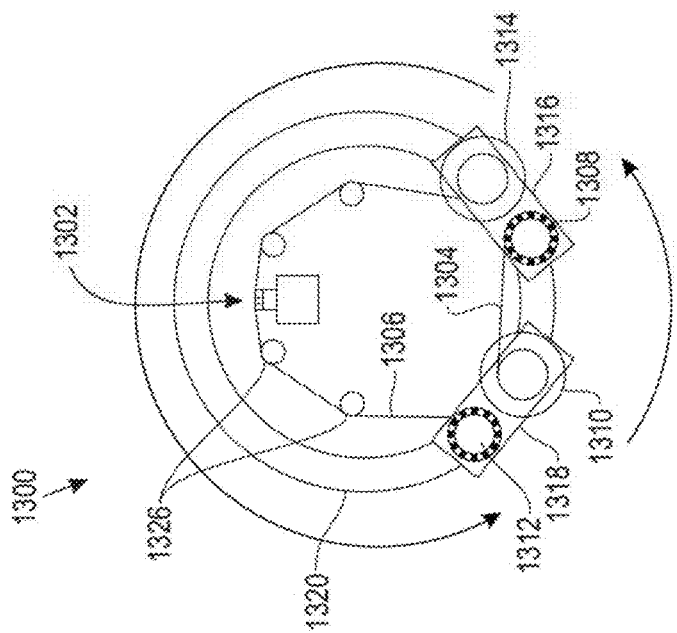
FIGS. 13A-13C are schematic representations of steps for tape self-threading using a tape drive, while performing overlapped operations, according to one embodiment.
Figure 13B:
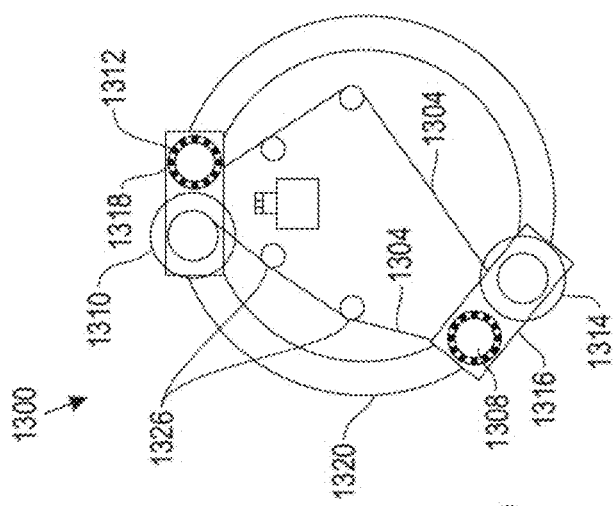
Figure 13A:
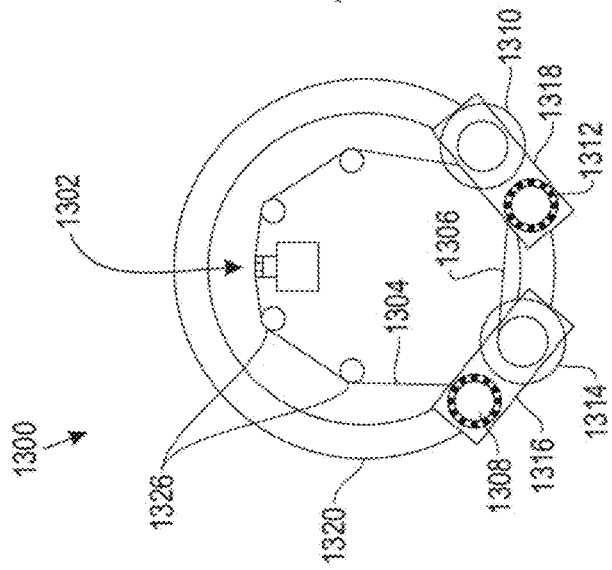

In yet another exemplary embodiment, a system 1300 may include two drive mechanisms, each having two motors. FIGS. 13A-13C depicts a tape drive system 1300, with the capability to perform overlapped operations in accordance with one embodiment. As an option, the present system 1300 may be implemented in conjunction with features from any other embodiment listed herein, such as those described with reference to the other FIGS. Of course, however, such system 1300 and others presented herein may be used in various applications and/or in permutations which may or may not be specifically described in the illustrative embodiments listed herein. Further, the system 1300 presented herein may be used in any desired environment. Thus FIGS. 13A-13C (and the other FIGS.) should be deemed to include any and all possible permutations.

As depicted in FIGS. 13A-13C, the system 1300 has two pairs of motors 1308, 1310 and 1312, 1314 respectively for allowing simultaneous operation on two tapes 1304, 1306. In the illustrative system 1300, two of the motors 1308, 1314 are mounted on one of the drive mechanisms 1316, while the other two motors 1310, 1312 are mounted on the other drive mechanism 1318.

Additionally, the path 1320 is more extended, relative to the embodiment shown in FIG. 9A, to form a closed loop. As a result, the path 1320 allows for shifting of the two drive mechanisms 1316, 1318 between positions near the bottom of the path 1320, e.g., as the two tapes 1304, 1306 are accessed. In a preferred approach, the two drive mechanisms 1316, 1318 are kept about centered at the bottom of the path 1320 as the data are read from and/or written to either of the tapes 1304, 1306, as illustrated in FIGS. 13A and 13C. This may preferably allow for optimization of the tape path, e.g., by maintaining a large wrap angle of the tape around the guides 1326 (e.g., see 225 of FIG. 2) and head 1302.

With continued reference to FIGS. 13A-13C, in order to switch the tape being accessed, the positions of the carts may be reversed. Looking to FIG. 13A, a first tape 1304 is being accessed, e.g., having data read from and/or written thereto. Moreover, a second tape 1306 is mounted where the pair of motors 1312, 1314 may be performing a coarse locate, rewind operation, etc.

Referring now to FIG. 13B, when the system wishes to access the second tape 1306, the drive mechanisms move along the path, e.g., in a counterclockwise direction as shown, during which the first tape 1304 is unthreaded and the second tape 1306 is threaded across the head 1302. As a result, the second tape may be accessed, while the first tape may be rewound, removed, etc., as illustrated in FIG. 13C.

It should be noted that although a counterclockwise motion was illustrated in FIGS. 13A-13C, in some approaches, the drive mechanisms may move in a clockwise motion, or a combination of clockwise and counterclockwise motion, to achieve the same functionality.

Moreover, in a preferred approach, the drive mechanisms may rotate counterclockwise every other tape switch, while rotating clockwise for the tape accesses therebetween. As a result, according to one approach, the signal and/or power connections to the drive mechanisms and/or motors may be provided by flexible cables, e.g., because each counterclockwise movement is followed by a clockwise movement so the flexible cables do not become wound. However, in an alternate approach, the drive mechanisms may rotate in only a counterclockwise or clockwise direction. Accordingly, power and/or signals may be delivered to the drive mechanisms and/or motors thereon via contacts with the path, sliding contacts, etc. Furthermore, the power being delivered and/or the number of leads required for the signals being sent to the drive mechanisms and/or motors may determine the type of connection used.

Figure 14:
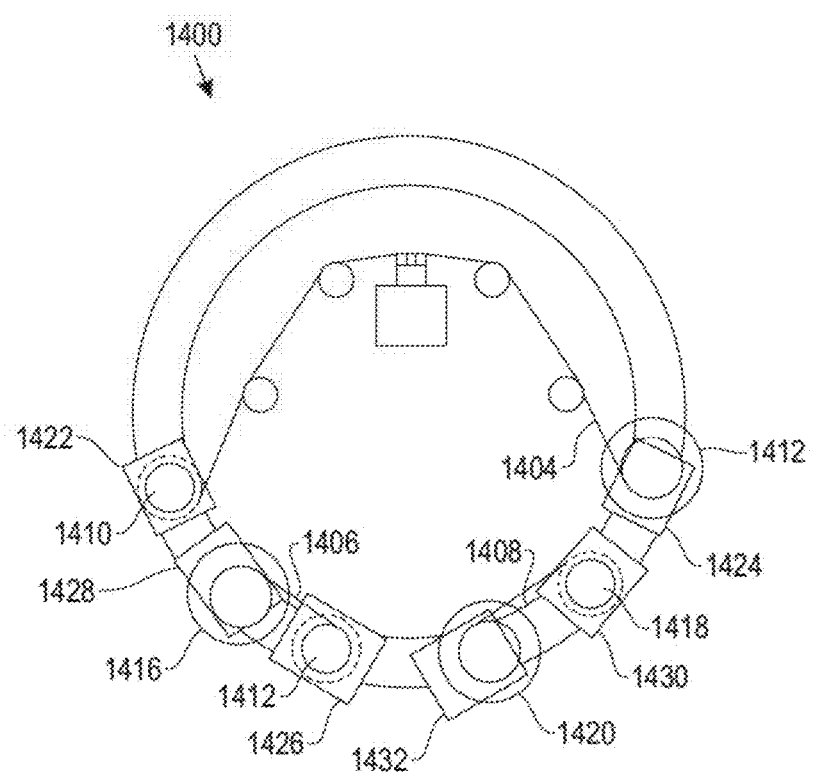
FIG. 14 is a schematic representation of a tape drive having the ability to perform overlapped operations on multiple tapes, according to one embodiment.

Referring now to FIG. 14, according to a similar embodiment to that illustrated in FIGS. 13A-13B, a system 1400 may include a closed loop path having three tapes which are loaded simultaneously. By increasing the capacity of a given tape drive, the cost of the storage system as a whole is reduced as additional drive mechanisms within fewer tape drives is a much less expensive solution to improving system throughput than including additional drives.

As illustrated in FIG. 14, each of the tapes 1404, 1406, 1408 correspond to a respective set of motors 1410, 1412, 1414, 1416, 1418, 1420. Moreover, each of the individual motors 1410, 1412, 1414, 1416, 1418, 1420 are mounted on separate drive mechanisms 1422, 1424, 1426, 1428, 1430, 1432. As a result, operations from the PRE, POST and RW stages described above may be performed simultaneously on the three different tapes 1404, 1406, 1408. Power and control signals may be provided to the drive mechanisms 1422, 1424, 1426, 1428, 1430, 1432 via any known technique, including those listed above.

According to one approach, the drive mechanisms may rotate in only one direction (e.g., counterclockwise or clockwise) to switch between which of the three tapes is being accessed. As a result, the system 1400 may have the advantage of requiring smaller individual angular motions to switch positions from adjacent one of the three tapes to adjacent another of the tapes. Such individual angular motions are preferably less than 360°.

In another approach, the drive mechanisms 1422, 1424, 1426, 1428, 1430, 1432 may be bi-directionally positionable. Thus, according to a further approach, flexible cables may be used to provide power and/or signal directions to the cart, e.g., without twisting.

Figure 15:
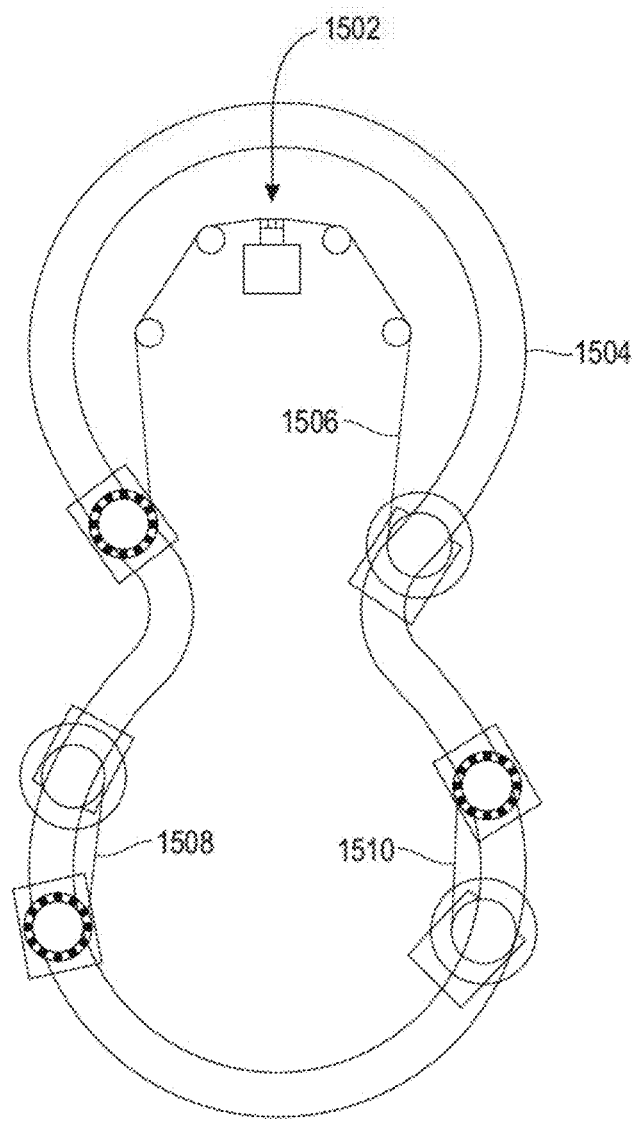
FIG. 15 is a schematic representation of a tape drive having the ability to perform overlapped operations on multiple tapes, according to one embodiment.

In yet another exemplary embodiment. FIG. 15 depicts a system 1500 having a path 1504 which incorporates a concave and a convex profile. As mentioned above, the concave profile preferably allows for a large wrap angle for the tape 1506 being accessed, e.g., having data read from and/or written to via the head 1502. Moreover, the concave profile additionally provides a long enough path perimeter to accommodate the other tapes 1508, 1510. Thus, according to different approaches, while the first tape 1506 is engaged and/or in the process of being engaged and or disengaged with the head 1502, the other tapes 1508, 1510 may be rewound, coarse located, loaded, detached, etc.

Moreover, according to various approaches, the system 1500 illustrated in FIG. 15 may incorporate any of the approaches described and/or suggested herein. Thus FIG. 15 (and the other FIGS.) should be deemed to include any and all possible permutations.

FIGS. 16A-16D depicts a system 1600, in accordance with one embodiment. As an option, the present system 1600 may be implemented in conjunction with features from any other embodiment listed herein, such as those described with reference to the other FIGS. Of course, however, such system 1600 and others presented herein may be used in various applications and/or in permutations which may or may not be specifically described in the illustrative embodiments listed herein. Further, the system 1600 presented herein may be used in any desired environment. Thus FIGS. 16A-16D (and the other FIGS.) should be deemed to include any and all possible permutations.

Referring now to FIGS. 16A-16D, rather than moving two or more tapes in a drive to be operated upon by a single head, the head 1602, and optionally tape guides, can be positioned to selectively engage the tapes, as will soon become apparent. The system 1600 includes a path 1614 along which the head 1602 is movable to selectively engage each of the tapes 1606, 1610. The system 1600 may also include logic integrated with and/or executable by a processor of a controller for controlling operations of the system 1600.

Figure 16A:
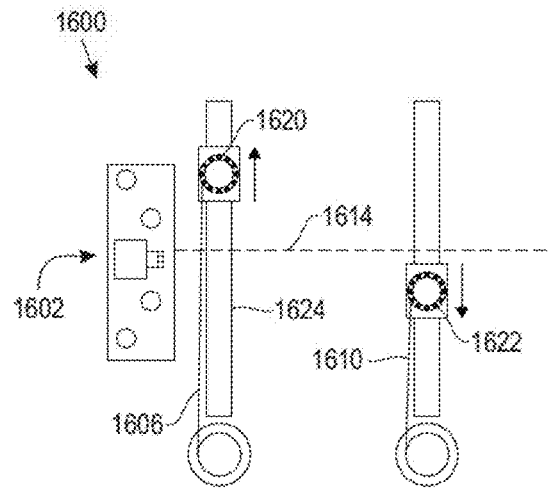
FIGS. 16A-16D are schematic representations of steps for tape self-threading using a tape drive, while performing overlapped operations, according to one embodiment.
Figure 16B:
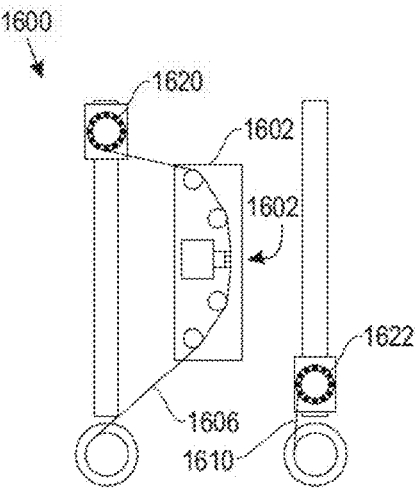

As illustrated in FIGS. 16A-16B, a first spool 1620 holding a portion of the first tape 1606 is moved towards an extended position along a tape track 1624. Once in the extended position, the first tape 1606 extends across the path 1614 along which the head 1602 is movable for enabling a read and/or write operation on the first tape 1606.

Figure 16C:
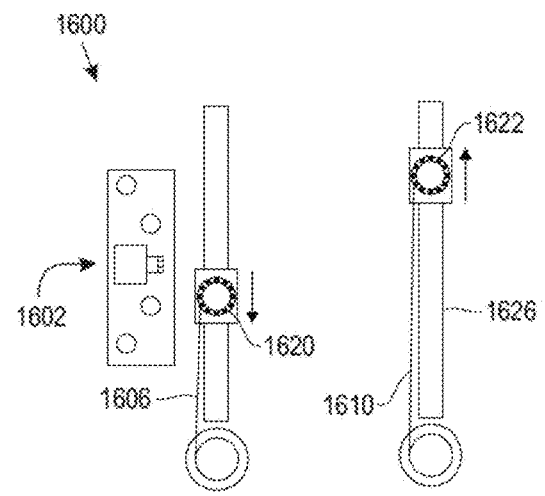
Figure 16D:
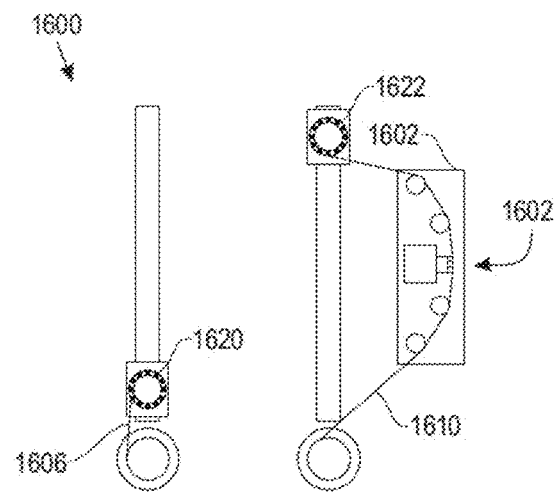

Moreover, as illustrated in FIGS. 16C-16D, after the operation shown in FIG. 16B is completed, the head 1602 is retracted and the first spool 1620 is retracted towards a retracted position. The second spool 1622 holding a portion of the second tape 1610 is moved towards an extended position along a second tape track 1626. Once in an extended position, the second tape 1610 is positioned across the path 1614 along which the head 1602 is movable for enabling a read and/or write operation on the second tape 1610.

Although in FIGS. 16A-16D the head 1602 is illustrated as moving relative to the tape, according to another approach there may be a relative motion between the head 1602 and the tapes 1606, 1610. For example, the head 1602 may be stationary while the tapes 1606, 1610 may be attached to a platform which moves relative to the stationary head 1602, e.g., to selectively engage the head 1602 with one of the tapes 1606, 1610.

Figure 17:
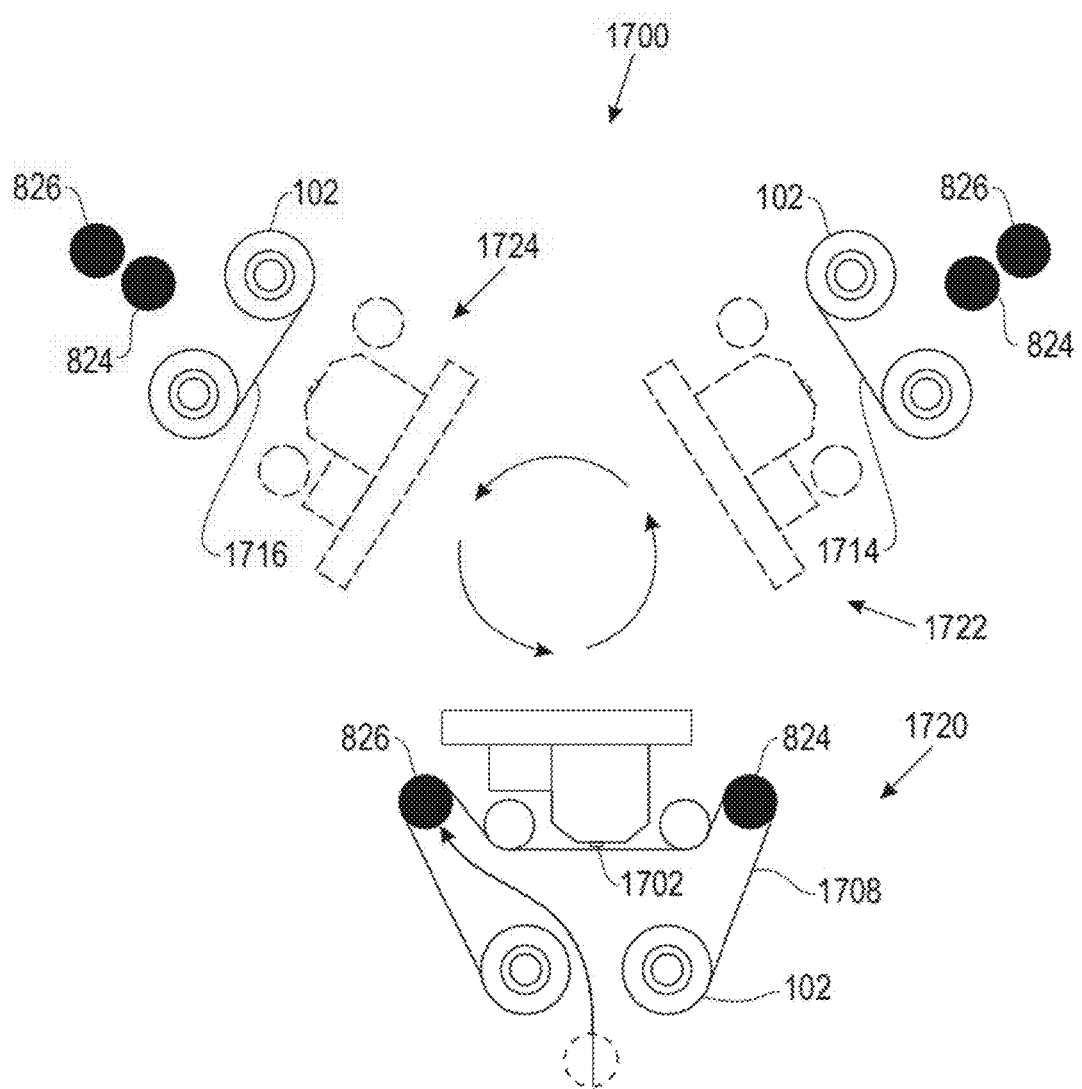
FIG. 17 is a schematic representation depicting steps for tape self-threading using a tape drive, while performing overlapped operations, according to one embodiment.

Referring now to another exemplary embodiment, FIG. 17 depicts a system 1700, in accordance with one embodiment. As an option, the present system 1700 may be implemented in conjunction with features from any other embodiment listed herein, such as those described with reference to the other FIGS. Of course, however, such system 1700 and others presented herein may be used in various applications and/or in permutations which may or may not be specifically described in the illustrative embodiments listed herein. Further, the system 1700 presented herein may be used in any desired environment. Thus FIG. 17 (and the other FIGS.) should be deemed to include any and all possible permutations.

According to the exemplary embodiment illustrated in FIG. 17, the tape drive system 1700 may include a mechanism configured to move the head 1702 between at least two different positions, where "between" any set of positions in this and/or other embodiments is intended to include positioning at the noted position. According to the exemplary embodiment illustrated in FIG. 17, the head 1702 may be positioned between three different positions 1720, 1722, 1724, e.g., corresponding to the locations of the three tapes 1708, 1714, 1716 shown. However, according to different approaches, the head may be positioned between at least two positions, at least four positions, etc., depending on the desired embodiment.

In a preferred approach, the head 1702 may be positioned between the three different positions by incorporating a relative motion therebetween. In one approach, the head 1702 may be rotated about a center point between the three tapes 1708, 1714, 1716. However, according to another approach, the system 1700 may create a relative motion between the head 1702 and tapes 1708, 1714, 1716, e.g., the tapes may rotate about the head 1702.

Tape threading operations may be performed in a manner similar to the embodiment illustrated in FIGS. 8E-8H. Accordingly, the system 1700 may include a first set of guides 824, 826 at each position. When the head 1702 is in the first position 1720, as illustrated in FIG. 17, the guides 824, 826 are positionable for causing the first tape 1708 to engage the head 1702, thereby enabling a read and/or write operation on the first tape 1708. Thus, the guides 824, 826 of FIG. 17 may function similarly to the guides 824, 826 of FIGS. 8E-8H.

Moreover, while the first tape 1708 is engaged and/or in the process of being engaged/disengaged with the head 1702, the second and third tapes 1714, 1716 may be rewound, coarse located, loaded, detached, etc.

When the head is in the second or third position 1722, 1724, the guides 824, 826 at the respective position thread the respective tape onto the head 1702.

With reference to the various embodiments described and/or suggested herein, each reel incorporated therein may be large enough (e.g., the flanges are big enough) to hold the entire length of tape, if all the tape is to be accessed. If the tape is stored in pairs of these large reels, the capacity of the library may be reduced by a factor of two from what it may be by using single reels.

Figure 18A:
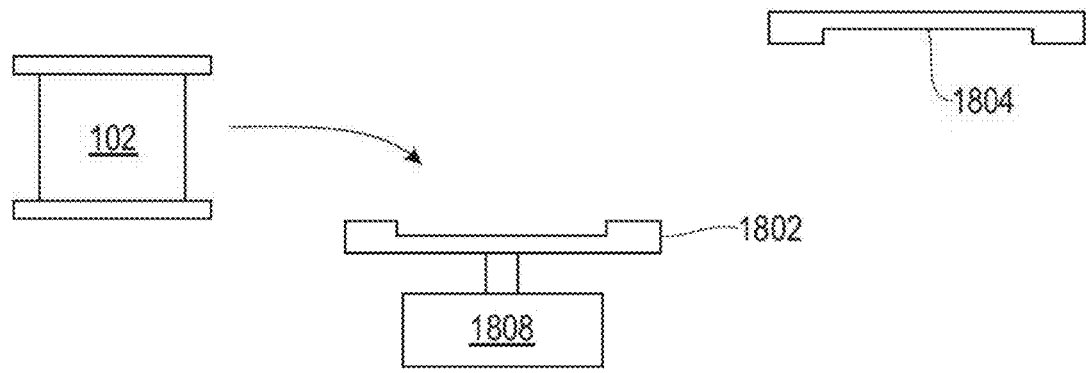
FIGS. 18A-18C are schematic representations of steps using flange extenders, according to one embodiment.
Figure 18B:
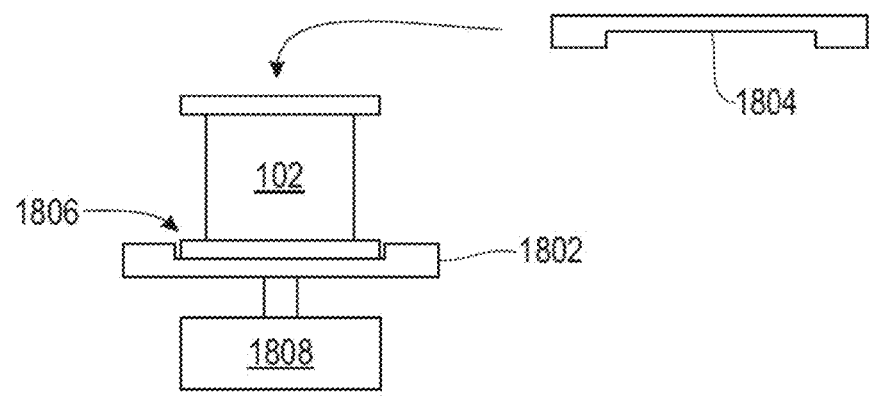
Figure 18C:
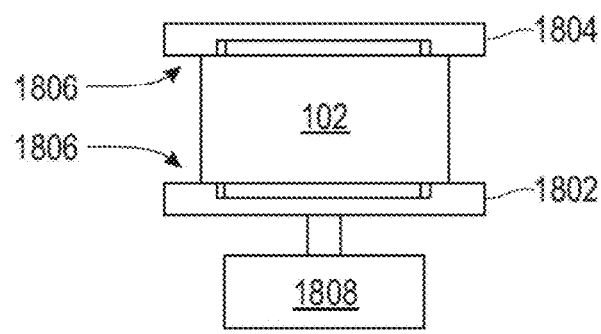

In another approach, the tape may be stored on a pair of reels, where at least one reel is not large enough to accept the entire length of tape. As shown in FIGS. 18A-18C, a reel-size reduction may be effected by incorporating temporary flange extenders 1802, 1804 in the tape drive. In the tape drive, a temporary flange extender 1802 is fixed to the motor/reel chuck 1808 so that the reel flange 1806 is extended when it is on the drive. Once the reels 102 are in the drive, another flange extender 1804 is placed on the top of each of the reels 102, so that tape can be spooled onto one of the reels. Before the tape reels 102 are unloaded from the tape drive, the tape is spooled back evenly between the tape reels 102, so that it lies only between the permanent flanges 1806 on the tape reels 102.

In another approach, a packing roller may be used to keep the tape on the reel after its diameter becomes bigger than the flange.

According to some approaches, a tape may be packaged in a cartridge containing one spool.

In other approaches, a tape may be packaged in a cartridge having two spools, in which tape is wound from one spool to the other (e.g. similar to a VHS cartridge configuration). However, it is not necessary that these two spools be contained within a cartridge, especially where the library robotics are able to access and/or transport the two spools without damaging the tape. Moreover, according to one approach, if a cartridge is used, one of the reels may be removed from the cartridge when the tape is loaded into a drive, e.g., to enable the reels to move separately for access (see FIGS. 9A-17). In another approach, a removable clip may be used to hold the spools together when not operating. For example, the clip may be removed when the spools are loaded into a drive, and then reattached when the spools are unloaded from the drive.

In some approaches, the tape library may be fault tolerant and/or self-repairing. For example, each tape cartridge may be read by a number of different drives, if a robot fails then other robots may maneuver around the failed robot, a failed robot may be towed away by another robot and replaced, and/or a failed tape drive may be towed away and replaced.

According to one embodiment, if a mobile robot fails, it may be towed away and replaced by another mobile robot. The tape drives may be configured so that a mobile robot may easily tow away and replace a tape drive, after temporarily clearing away the tape reels that may be in the path taken to remove the tape drive. The power and data connections may be made to use very little force, for example, using simple sliding spring contacts for the power and optical link for the tape drive data transfer.

According to one embodiment, the system may be configured to allow removal of a failed mobile robot using another mobile robot, in which case the failed mobile robot may then be replaced with the mobile robot performing the removing or another mobile robot, in some approaches.

In another embodiment, the mobile robot may be configured to remove the tape drive, e.g., if the tape drive is broken. Likewise, the robot may install a replacement or repaired tape drive.

Any of the embodiments described and/or suggested herein may be combined with various functional methods, depending on the desired embodiment.

Figure 21:
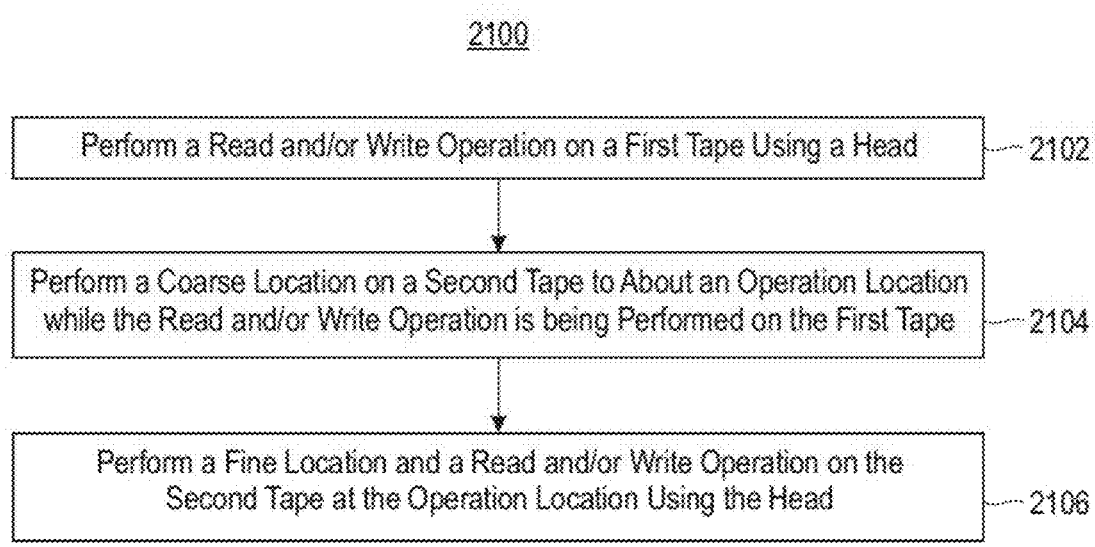
FIG. 21 is a flowchart of a method, according to one embodiment.

FIG. 21 depicts a method 2100, in accordance with one embodiment. As an option, the present method 2100 may be implemented in conjunction with features from any other embodiment listed herein, such as those described with reference to the other FIGS. Of course, however, such method 2100 and others presented herein may be used in various applications and/or in permutations which may or may not be specifically described in the illustrative embodiments listed herein. Further, the method 2100 presented herein may be used in any desired environment. Thus FIG. 21 (and the other FIGS.) should be deemed to include any and all possible permutations.

As illustrated, the method 2100 includes performing a read and/or write operation on a first tape using a head. See operation 2102.

Additionally, the method 2100 includes performing a coarse location (prelocation) on a second tape to about an operation location while the read and/or write operation is being performed on the first tape. See operation 2104. Referring to the present description, the operation location refers to an approximate or actual physical location of data to be retrieved from the tape, an approximate location of a next write operation, etc. According to a preferred approach, by performing a coarse location to about the operation location, the tape is spooled to a section of tape that is close to the operation location, e.g., within about 25 mm of the operation location. In some approaches, the operation location may span for some length of the tape. Thus, performing a coarse location operation may spool a tape within about 25 mm of any position within the span of tape corresponding to the operation location. As noted above, overlapping operations may be performed in parallel. For example, the coarse locating of operation 2104 may be performed on the second tape while the first tape is being loaded, unloaded, coarse located, read, written to, etc.

With continued reference to FIG. 21, operation 2106 of method 2100 includes performing a fine location and a read and/or write operation on the second tape at the operation location using the head. Operation 2106 may occur while the first tape is still coupled to the tape drive, perhaps being rewound onto its spool.

In one approach, the coarse location, fine location and read and/or write operation of the first and second tapes in method 2100 may each be conducted using a motor, e.g., according to any of the approaches described and/or suggested herein. Moreover, in a preferred approach, the motor used for the coarse location of the second tape may also be used for the fine location and read and/or write operation of the second tape.

According to one approach, the motors used for the coarse location, fine location and read and/or write operation of the first and second tapes may be coupled to or included in a drive mechanism according to any of the approaches described and/or suggested herein. Thus, in one approach, the motors may be positionable along a path (e.g., see 914 of FIGS. 9A-9F). According to a further approach, at least one motor used for the coarse location of the second tape may physically move, e.g., along the path, to wrap the second tape over the head.

However, as described above, according to some approaches, the locating and/or unlocating may be performed away from the drive itself (e.g., not on the drive mechanisms) at a winding station. Thus, according to a preferred approach, the winding stations may not require transducers. In various approaches, winding stations may be used with single spools and/or dual spools (e.g., in a cartridge, without a cartridge, etc.). Dual spools may be loaded into a winding station, located, then unloaded from the winding station, whereby the dual spool may then be transferred to a drive, e.g. to read and/or written to.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 19:
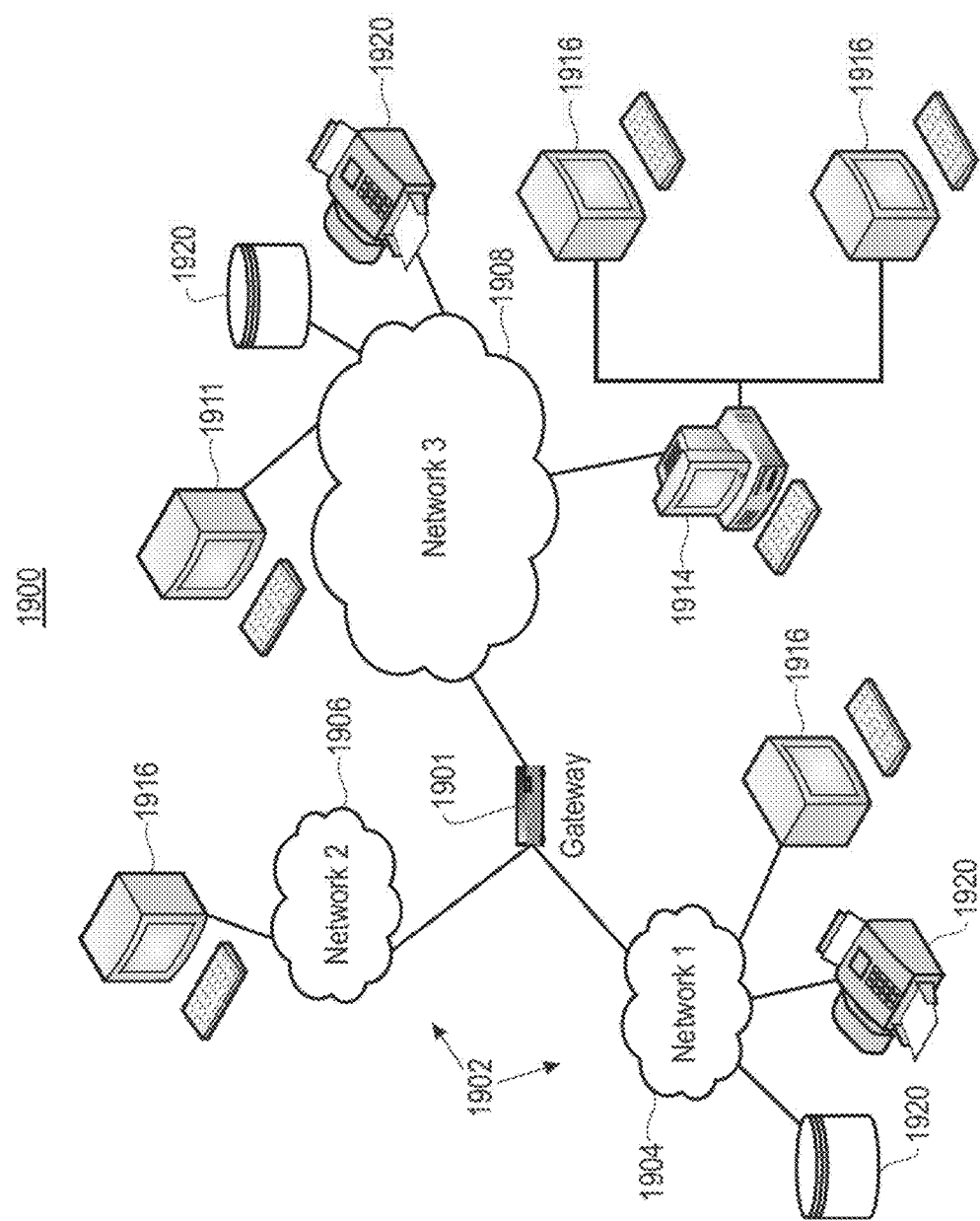
FIG. 19 is a depiction of a network architecture, according to one embodiment.

FIG. 19 illustrates a network architecture 1900, in accordance with one embodiment. As an option, the network architecture 1900 may be implemented in conjunction with features from any other embodiment listed herein, such as those described with reference to the other FIGS. Of course, however, such network architecture 1900 and others presented herein may be used in various applications and/or in permutations which may or may not be specifically described in the illustrative embodiments listed herein. Further, the network architecture 1900 presented herein may be used in any desired environment.

As shown in FIG. 19, a plurality of remote networks 1902 are provided including a first remote network 1904 and a second remote network 1906. A gateway 1901 may be coupled between the remote networks 1902 and a proximate network 1908. In the context of the present network architecture 1900, the networks 1904, 1906 may each take any form including, but not limited to a LAN, a WAN such as the Internet, public switched telephone network (PSTN), internal telephone network, etc.

In use, the gateway 1901 serves as an entrance point from the remote networks 1902 to the proximate network 1908. As such, the gateway 1901 may function as a router, which is capable of directing a given packet of data that arrives at the gateway 1901, and a switch, which furnishes the actual path in and out of the gateway 1901 for a given packet.

Further included is at least one data server 1914 coupled to the proximate network 1908, and which is accessible from the remote networks 1902 via the gateway 1901. It should be noted that the data server(s) 1914 may include any type of computing device/groupware. Coupled to each data server 1914 is a plurality of user devices 1916. Such user devices 1916 may include a desktop computer, lap-top computer, hand-held computer, printer or any other type of logic. It should be noted that a user device 1911 may also be directly coupled to any of the networks, in one embodiment.

A peripheral 1920 or series of peripherals 1920, e.g., facsimile machines, printers, networked and/or local storage units or systems, etc., may be coupled to one or more of the networks 1904, 1906, 1908. It should be noted that databases and/or additional components may be utilized with, or integrated into, any type of network element coupled to the networks 1904, 1906, 1908. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of a hypervisor, in some embodiments.

In more approaches, one or more networks 1904, 1906, 1908, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 20:
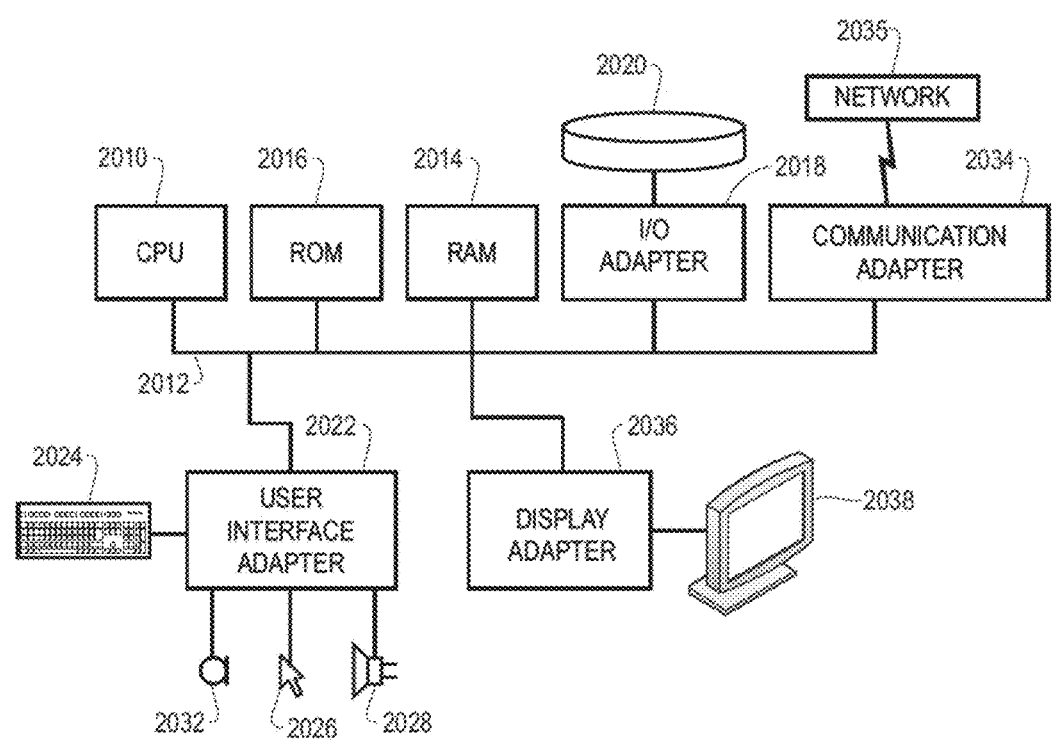
FIG. 20 is a system diagram of a representative hardware environment that may be associated with the servers and/or clients of FIG. 19, according to one embodiment.

FIG. 20 shows a representative hardware environment associated with a user device 1916 and/or server 1914 of FIG. 19, in accordance with one embodiment. Such figure illustrates a typical hardware configuration of a workstation having a central processing unit 2010, such as a microprocessor, and a number of other units interconnected via a system bus 2012.

The workstation shown in FIG. 20 includes a Random Access Memory (RAM) 2014, Read Only Memory (ROM) 2016, an I/O adapter 2018 for connecting peripheral devices such as disk storage units 1020 to the bus 2012, a user interface adapter 1022 for connecting a keyboard 1024, a mouse 1026, a speaker 1028, a microphone 2032, and/or other user interface devices such as a touch screen and a digital camera (not shown) to the bus 2012, communication adapter 2034 for connecting the workstation to a communication network 2035 (e.g., a data processing network) and a display adapter 2036 for connecting the bus 2012 to a display device 2038.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the methodologies and embodiments described herein may be combined in any way, creating a plurality of combinations from the descriptions presented herein.

Communications components such as input/output or I/O devices (including but not limited to keyboards, displays, pointing devices, etc.) may be coupled to the system either directly or through intervening I/O controllers.

Communications components such as buses, interfaces, network adapters, etc., may also be coupled to the system to enable the data processing system, e.g., host, to become coupled to other data processing systems, remote printers, storage devices, etc., through intervening private or public networks. Modems, cable modems, and Ethernet cards are just a few of the currently available types of network adapters that may be used, in some approaches.

It will be further appreciated that embodiments described herein may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
   a reel;
   a tape coupled to the reel; and
   a spring-like clip coupled to a free end of the tape, the clip being selectively positionable in a wrapped position where the clip wraps around a portion of the tape when the tape is wound onto the reel, thereby holding the portion of the tape in place on the reel,
   wherein the spring-like clip is resiliently deformable,
   wherein the spring-like clip has a rounded profile along a longitudinal length thereof when decoupled from the tape and in the absence of any external forces.

2. The product as recited in claim 1, wherein the clip includes an engagement feature configured to enable the clip to be pulled from the wrapped position.

3. The product as recited in claim 2, wherein the engagement feature is a bent portion of the spring-like clip.

4. The product as recited in claim 2, wherein the engagement feature includes at least one of a hole and a barb.

5. The product as recited in claim 1, wherein a free end of the clip has a bent portion.

6. The product as recited in claim 1, wherein at least one surface of the clip has a surface feature for reducing surface friction of the clip.

7. The product as recited in claim 1, wherein the stiffness of the clip varies along its length.

8. The product as recited in claim 7, wherein a free end of the clip has greater stiffness than an end of the clip coupled to the tape.

9. The product as recited in claim 1, wherein the length of the clip between a free end thereof and an end thereof coupled to the tape is at least one-half of the circumference of an outer surface of the tape when the tape is wound completely on the reel.

10. The product as recited in claim 1, wherein the length of the clip between a free end thereof and an end thereof coupled to the tape is greater than the circumference of an outer surface of the tape when the tape is wound completely on the reel.

11. The product as recited in claim 1, wherein the clip has a width in the range from 20% of the tape's width to 100% of the tape's width.

12. The product as recited in claim 1, wherein the clip's width is greater than the tape's width.

13. The product as recited in claim 1, wherein the clip is coupled to the free end of the tape by a tape leader having a length as measured between the clip and the tape of at least one circumference of an outer surface of the tape when the tape is wound completely on the reel.

14. The product as recited in claim 1, wherein the spring-like clip is magnetically permeable.

15. The product as recited in claim 1, wherein the clip's width is greater than the tape's width, wherein flanges of the reel include grooves for receiving the clip, wherein the clip is radially offset from an outermost wrap of the tape.

16. The product as recited in claim 1, wherein stiffness of the clip varies along its length, wherein a free end of the clip has greater stiffness than an end of the clip coupled to the tape.

17. The product as recited in claim 1, wherein the length of the clip between a free end thereof and an end thereof coupled to the tape is between 50% and 100% of the circumference of an outer surface of the tape when the tape is wound completely on the reel.

18. The product as recited in claim 1, wherein the length of the clip between a free end thereof and an end thereof coupled to the tape is greater than the circumference of an outer surface of the tape when the tape is wound completely on the reel.

19. The product as recited in claim 1, wherein a free end of the clip has a bent portion for enabling optical detection of the bent portion by an optical detector.

20. A spring-like clip for a spool of tape, one end of the clip being attached to one end of the tape, and another end of the clip having an engagement feature that allows the clip to be pulled from the spool, wherein the clip is configured to curve around the spool to hold the tape in place wherein the spring-like clip is resiliently deformable, wherein the spring-like clip has a rounded profile along a longitudinal length thereof when decoupled from the spool and in the absence of any external forces, wherein the length of the clip between a free end thereof and an end thereof coupled to the tape is between 50% and 100% of the circumference of an outer surface of the tape when the tape is wound completely on the reel, wherein a free end of the clip has a bent portion for enabling optical detection of the bent portion by an optical detector.

21. The clip of claim 20, wherein the clip is configured to assume a relatively less-curved geometry when pulled by the engagement feature, thereby permitting the clip to be passed to a take-up reel.

22. The clip of claim 20, wherein the engagement feature is configured (i) to engage a transfer mechanism when loading the tape and (ii) disengage the transfer mechanism when unloading the tape.

23. The clip of claim 20, the clip including surface features that reduce surface friction between the clip and a surface abutting the clip, and facilitate clip unloading.

24. The clip of claim 20, wherein the clip has varied stiffness along its length for facilitating uncurling of the clip when loading the tape onto a take-up mechanism, while maintaining the holding properties of the clip.

* * * * *